United States Patent
Kravets et al.

(10) Patent No.: US 10,444,887 B2
(45) Date of Patent: Oct. 15, 2019

(54) FORCE SENSING

(71) Applicant: Cypress Semiconductor Corporation, San Jose, CA (US)

(72) Inventors: Igor Kravets, Lviv (UA); Igor Kolych, Lviv (UA); Oleksandr Hoshtanar, Lviv (UA); Jens Weber, Munich (DE); Oleksandr Karpin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/636,986

(22) Filed: Jun. 29, 2017

(65) Prior Publication Data

US 2018/0081479 A1   Mar. 22, 2018

Related U.S. Application Data

(60) Provisional application No. 62/397,289, filed on Sep. 20, 2016.

(51) Int. Cl.
*G06F 3/041* (2006.01)
*G06F 3/044* (2006.01)
(Continued)

(52) U.S. Cl.
CPC ............ *G06F 3/0414* (2013.01); *G01L 1/142* (2013.01); *G06F 1/1637* (2013.01); *G06F 3/016* (2013.01);
(Continued)

(58) Field of Classification Search
CPC .... G06F 3/044; H03K 17/962; H03K 17/955; H03K 17/9645; G01D 5/24
See application file for complete search history.

(56) References Cited

U.S. PATENT DOCUMENTS 7,162,252 B2   1/2007 Kennedy
8,266,971 B1 *  9/2012 Jones ................ G01L 1/146
                                                73/862.046
(Continued)

FOREIGN PATENT DOCUMENTS

EP    2856200 A1   4/2015
EP    2992353 A2   3/2016
(Continued)

OTHER PUBLICATIONS

International Search Report for International Application No. PCT/US2017/45962 dated Dec. 11, 2017; 4 pages.
(Continued)

*Primary Examiner* — William Lu

(57) ABSTRACT

An apparatus including a first signal generator of a force sensing circuit to output a first excitation (TX) signal on a first terminal and a second TX signal on a second terminal. The first terminal and the second terminal are configured to couple to a first force sensor and a reference sensor. The apparatus includes a first receiver channel coupled to a third terminal and a fourth terminal. The third terminal is configured to couple to the first force sensor and the fourth terminal is configured to couple to the reference sensor. The force sensing circuit is configured to measure a first receive (RX) signal from the first force sensor via the third terminal and a second RX signal from the reference sensor via the fourth terminal. The force sensing circuit is configured to measure a force value indicative of a force applied to the first force sensor.

21 Claims, 20 Drawing Sheets

(51) Int. Cl.
*G06F 3/01* (2006.01)
*G01L 1/14* (2006.01)
*G06F 1/16* (2006.01)

(52) U.S. Cl.
CPC ............ *G06F 3/044* (2013.01); *G06F 3/0416* (2013.01); *G06F 3/0418* (2013.01); *G06F 2203/04105* (2013.01); *G06F 2203/04111* (2013.01)

(56) References Cited

U.S. PATENT DOCUMENTS

| | | | |
|---|---|---|---|
| 8,704,728 | B2 | 4/2014 | Mujahed et al. |
| 9,121,923 | B2 | 9/2015 | Bull et al. |
| 9,164,605 | B1 * | 10/2015 | Pirogov .................. G06F 3/041 |
| 9,235,267 | B2 | 1/2016 | Burrough et al. |
| 9,274,231 | B2 | 3/2016 | Ische et al. |
| 9,280,205 | B2 | 3/2016 | Rosenberg et al. |
| 9,349,552 | B2 | 5/2016 | Huska et al. |
| 9,360,546 | B2 | 6/2016 | Kim et al. |
| 9,535,557 | B2 | 1/2017 | Bernstein et al. |
| 9,595,996 | B2 | 3/2017 | Yun et al. |
| 9,600,076 | B2 | 3/2017 | Levesque et al. |
| 9,652,090 | B2 * | 5/2017 | Tan .......................... G06F 3/044 |
| 2002/0149571 | A1 | 10/2002 | Roberts |
| 2010/0060604 | A1 * | 3/2010 | Zwart .................. G06F 1/1601 345/173 |
| 2011/0141052 | A1 | 6/2011 | Bernstein et al. |
| 2011/0167391 | A1 * | 7/2011 | Momeyer ............. G06F 1/1684 715/863 |
| 2012/0105358 | A1 | 5/2012 | Momeyer et al. |
| 2014/0028576 | A1 * | 1/2014 | Shahparnia ........... G06F 3/0416 345/173 |
| 2014/0028577 | A1 * | 1/2014 | Krah ..................... G06F 3/0416 345/173 |
| 2014/0049505 | A1 * | 2/2014 | Radivojevic ........ G06F 3/04883 345/174 |
| 2014/0125471 | A1 | 5/2014 | Organ et al. |
| 2014/0269389 | A1 | 9/2014 | Bukkfejes et al. |
| 2015/0022224 | A1 * | 1/2015 | Ruusunen ............. G06F 3/0416 324/691 |
| 2015/0374280 | A1 * | 12/2015 | Tomasi ............... A63B 71/0686 600/409 |
| 2016/0103545 | A1 | 4/2016 | Filiz et al. |
| 2016/0327631 | A1 | 11/2016 | Salokannel et al. |
| 2016/0328065 | A1 * | 11/2016 | Johnson ............... G06F 3/03545 |
| 2016/0357342 | A1 | 12/2016 | Olley et al. |
| 2017/0026798 | A1 | 1/2017 | Prevatt |
| 2017/0075465 | A1 * | 3/2017 | Pedder ................. G06F 3/0414 |
| 2017/0090668 | A1 * | 3/2017 | Agarwal ............... G06F 3/0418 |

FOREIGN PATENT DOCUMENTS

| | | |
|---|---|---|
| WO | 200235461 A1 | 5/2002 |
| WO | 2009124211 A1 | 10/2009 |
| WO | 2011051722 A2 | 5/2011 |

OTHER PUBLICATIONS

Written Opinion for the International Searching Authority for International Application No. PCT/US2017/45962 dated Dec. 11, 2017; 5 pages.
Scholtes, J, "Analysis of a Haptic Control Architecture" Eindhoven University of Technology, Jun. 2009; 116 pages.

* cited by examiner

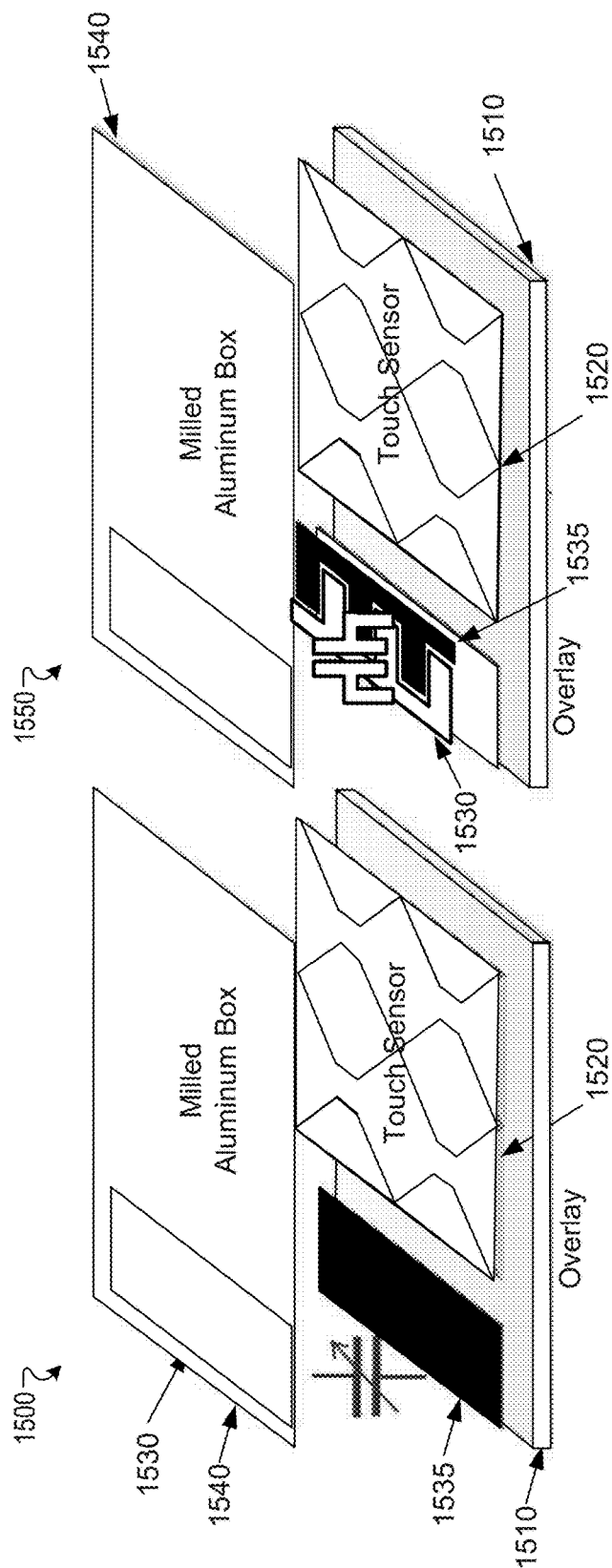

FORCE SENSING

RELATED APPLICATIONS

This application claims the benefit of U.S. Provisional Application No. 62/397,289 filed on Sep. 20, 2016, the contents of which are hereby incorporated by reference herein.

BACKGROUND

Computing devices, such as notebook computers, personal data assistants (PDAs), mobile communication devices, portable entertainment devices (such as handheld video game devices, multimedia players, and the like), and set-top-boxes (such as digital cable boxes, digital video disc (DVD) players, and the like) may have user interface devices, which are also known as human interface devices (HID), that facilitate interaction between the user and the computing device. One type of user interface device that has become more common is a sensing system that operates by way of touch sensing, such as capacitance sensing. A sensing system, such as a force sensing system, may include a processing device and one or more force sensing electrodes. The capacitance detected of the force sensing electrodes by a processing device may change as a function of the force of a touch object to an overlay.

BRIEF DESCRIPTION OF THE DRAWINGS

The present disclosure is illustrated by way of example, and not by way of limitation, in the figures of the accompanying drawings.

FIG. 15A illustrates a type of force sensor that may be implemented in embodiments FIG. 15B illustrates a type of force sensors that may be implemented in other embodiments.

DETAILED DESCRIPTION

Figure 1:
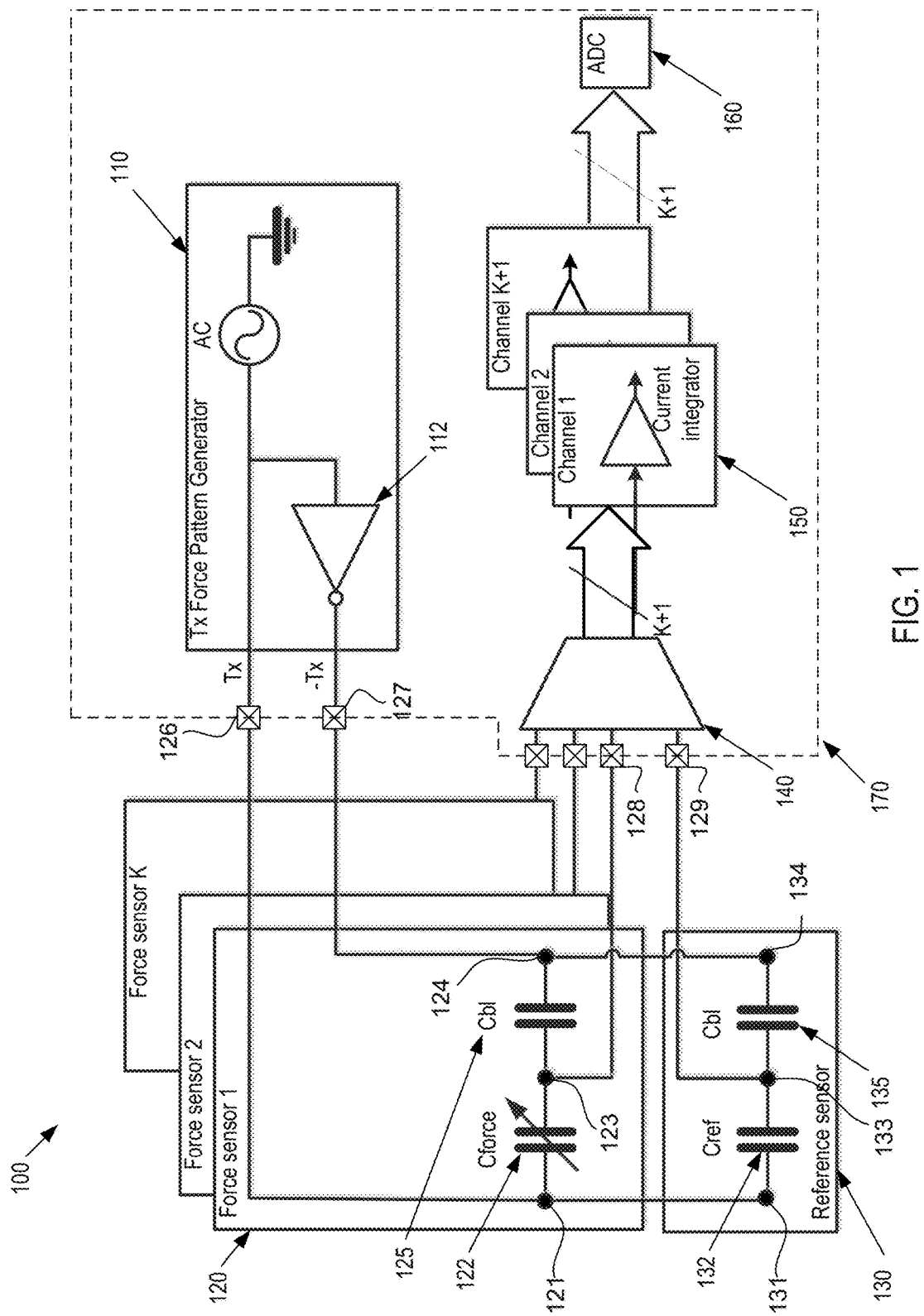
FIG. 1 is a diagram illustrating a force sensing system having multiple force sensors and a reference sensor, according to an embodiment.

Touch panel devices may use the elasticity of a device to detect the change in capacitance signals received from force sensors (represented as capacitors in various figures) placed at various locations on the touch panel device. A force being exerted by a touch object (e.g., a finger, stylus, etc.) on the touch panel may change the geometry of the touch panel device, resulting in a change in the capacitance of the touch panel device. The touch panel device may be subjected to external forces and factors, such as vibration, humidity and temperature change. Exposure of the touch panel to vibrations, such as in an automobile, may result in noise in a signal, representing capacitance of the force sensors, received from the touch panel, affecting the resolution of the detection of force by the touch panel. To reduce the impact of vibration of the signals, materials and components may be placed underneath the touch panel to absorb a portion of the vibrations. For example, springs or rubber foam may be placed at various locations, such as near the force sensors or in between the electrodes of a capacitor, on a touch panel. Then, force sensing circuitry, which is coupled to the force sensor(s), may measure the force as a function of the compression of the spring or rubber foam located near the force sensor(s). However, if a material is too stiff, a force applied to the touch panel may not cause a change in capacitance on the touch panel device. Conversely, if the material is too soft, then the material will not absorb vibrations, decreasing the resolution of the detection of force by the touch panel. Furthermore, the use of a soft material may result in what is known as "memory effect," where the touch panel device may falsely identify a force being exerted on the touch panel due to the touch panel not returning to its original geometry within a certain amount of time. For example, if a force is exerted on the touch panel device and is then removed, but it takes the touch panel one second to return to its original geometry, then the touch panel device may falsely identify a force being exerted on the touch panel for an additional second as the touch panel returns to its original geometry.

Design limitations of a touch panel device may result in springs and/or foam needing to be put in locations that are not located near the force sensors. For example, the springs and/or rubber foam may be located on the sides of the touch panel while the force sensors may be located on the corners. Moreover, designs may require the use of more springs and/or rubber foam than force sensors. For example, a design may call for six springs to be used to support a touch panel, while there may be only four force sensors. In the present example, the force sensors may not be measuring the compression of the springs and/or rubber foam near the force sensor, but rather are measuring an averaged value of the compression of the springs and/or rubber foam attached to the touch panel. In such cases, it is not possible to estimate multiple (e.g., three or more) forces being exerted by touch objects on the touch panel.

Haptic feedback may be used by a touch panel device to provide physical sensations to give a user of the touch panel device feedback. For example, then a user presses down on a touch panel, the touch panel may vibrate to indicate that the touch has been detected by the touch panel device. When a user presses down on a touch panel using two or more fingers, the touch panel device provides haptic feedback to all of the user's fingers that are in contact with the touch panel at the same time. This may be uncomfortable for the user and may make the use of haptic feedback on touch panel devices undesirable.

The present disclosure addresses the above-mentioned and other deficiencies by receiving, by a force sensing circuit, a first signal from a force sensor and a second signal from a reference sensor and measuring a force value indicative of a force applied to the first force sensor using the first signal and the second signal. The force sensing circuit uses the second signal received from the reference sensor to remove noise from the first signal caused by vibrations, background noise and temperature change on the touch panel device, increasing resolution of the detection of force by the touch panel.

In one embodiment, a signal generator of a force sensing circuit outputs a first excitation (TX) signal on a first terminal and outputs a second TX signal on a second terminal. The first terminal and the second terminal may be configured to couple to a first force sensor and a reference sensor. A first receiver channel of the force sensing circuit may be coupled to a third terminal and a fourth terminal, wherein the third terminal is configured to couple to the first force sensor and the fourth terminal is configured to couple to the reference sensor. The first force sensing circuit may measure a first receive (RX) signal from the first force sensor via the third terminal and a second RX signal from the reference center via the fourth terminal. The first force sensing circuit may then measure a force value that is indicative of a force applied to the first force sensor using the first RX signal from the first force sensor and the second RX signal from the reference sensor.

In another embodiment, a first TX signal and a second TX signal may be generated. The first force sensing circuit may then measure a first capacitance of a first force sensor. The first force sensing circuit may also measure a second capacitance of a reference sensor. The first force sensing circuit may then determine a force applied to the first force sensor based on the first capacitance and the second capacitance.

In another embodiment, a processing device may be operatively coupled to a force touch panel. The force touch panel may include a first force sensor and a reference sensor. The processing device may include a first signal generator of a force sensing circuit that outputs a first TX signal and a second TX signal. The first TX signal may be configured to couple to the first force sensor and the reference sensor. The processing device may also include a first receiver channel of the force sensing circuit that is coupled to the first force sensor and the reference sensor. The first receiver channel of the force sensing circuit may be configured to measure a first RX signal from the first force sensor and a second RX signal from the reference sensor. The first force sensing circuit may then measure a force value that is indicative of a force applied to the first force sensor using the first RX signal from the first force sensor and the second RX signal from the reference sensor.

Although embodiments of the present disclosure are discussed using capacitive force sensors, other embodiments may use other types of force sensors including, but not limited to, inductive sensors, resistive sensors and piezoelectric sensors.

FIG. 1 is a diagram illustrating a force sensing system having multiple force sensors 120 and a reference sensor 130, according to an embodiment. Force sensing system 100 includes a signal generator 110 that outputs a repeating signal (Tx) on a first terminal 126. Examples of terminals may include general-purpose input/outputs (GPIOs), specialized inputs/outputs, dedicated inputs and dedicated outputs that may couple to, pins, pads, solder bumps or the like. The signal generator 110 may include a power source that generates the repeating signal on the first terminal 126 and an inverter 112 that produces an inverted copy of the repeating signal (−TX) on a second terminal 127. Although FIG. 1 illustrates force sensing system 100 having a single signal generator 110, in other embodiments force sensing system 100 may include multiple signal generators 110. For example, one signal generator generates the Tx signal and another signal generator generates the −Tx signal.

The signal generator 110, via the first terminal 126 and the second terminal 127, may be configured to couple to one or more force sensors 120, as well as a reference sensor 130. In one embodiment, the force sensors 120 may be located at various locations on a touch panel of a touch panel device. As illustrated in FIG. 1, a first node 121 and a second node 123 are separated by a force sensing capacitor 122 (Cforce) formed by a first electrode and a second electrode. The second node 123 and a third node 124 are separated by a baseline capacitor 125 (Cbl) formed by a third electrode and a fourth electrode. The first node 121 is coupled to a first terminal 126, the third node 124 is coupled to a second terminal 127, and the second node 123 is coupled to a third terminal 128. The nodes 121, 123, and 124 and terminals 126, 127, and 128 can be said to be configured in a half-bridge circuit. The full-bridge circuit of the force sensor 120 and a reference sensor 130 (described in more detail below) can be used to minimize internal noise floor of the silicon and voltage supply noise.

Also, as illustrated in FIG. 1, a fourth node 131 and a fifth electrode 133 are separated by a reference capacitor 132 (Cref) formed by a fifth electrode and a sixth electrode. The fifth node 133 and a sixth node 134 are separated by a baseline capacitor 135 (Cbl) formed by a seventh electrode and an eighth electrode. The fourth node 131 is coupled to the first terminal 126, the fifth node 134 is coupled to the second terminal 127, and the sixth node 133 is coupled to a fourth terminal 129. The nodes 131, 133, and 134 and terminals 126, 127, and 129 can be said to be configured in a half-bridge circuit. The half-bridge circuit of the force sensor 120 and the half-bridge circuit of the reference sensor 130 can be used to minimize internal noise floor of the silicon and voltage supply noise. The reference sensor 130 can be used to reduce noise introduced by accelerations, temperature change and vibrations. The proposed embodiments can be used with force sensing methods that result in a large signal-to-noise ratio (SNR) and a large force sensing resolution. The force sensing capacitor 122 represents the variable capacitance that can be measured in response to force applied to the force sensor 120, whereas the baseline capacitor 125 represents a fixed capacitance that is used to minimize a baseline signal using a signal from a signal generator, as described below in more detail. The reference capacitor 132 represents a reference capacitance and the baseline capacitor 135 represents the fixed capacitance that is used to minimize a baseline signal using a signal from the signal generator. Additional details of the reference sensor 130 are provided below.

The force sensors 120 may include various configurations of the electrodes in the half-bridge circuit. For example, the force sensor 120 may include the first electrode and the second electrode that vary in capacitance (as represented in the variable force sensing capacitor 122) between the two electrodes in response to a change in distance (also referred to as "clearance" hereafter) between the first electrode and the second electrode. For example, when a force is applied to force sensor 120 by a touch object (e.g., a finger, stylus, etc.) or when an external force (e.g., vibrations) is applied to force sensing system 100, the distance between the first electrode and the second electrode may increase or decrease, which may change the variable capacitance (as represented by the variable force sensing capacitor 122). Therefore, a change in variable capacitance between the first electrode and the second electrode may correlate to a force applied to the force sensor 120, an external force applied to the force sensing system 100, or it may correlate to both. In one embodiment, the first electrode and the second electrode of the force sensor 120 may be parallel plates disposed in different planes, such as illustrated in FIG. 15A. In some embodiments, a dielectric material may be disposed in between the parallel plates. In another embodiment, the force sensor 120 may be co-planar, where the two electrodes are disposed in a same plane with one another, such as illustrated in FIG. 15B.

As described above, the baseline capacitor 125 (electrodes 123, 124) may have a fixed capacitance and may be used to generate a baseline signal using the received signal from a signal generator 110. In one embodiment, the baseline capacitor 125 may minimize a baseline value which may reduce the noise floor of an output signal of the force sensor 120. The force sensor 120 may produce an output signal to the third terminal 128, where the output signal may indicate a change in capacitance caused by the force. In one embodiment, the force sensor 120 may be coupled to a force sensing circuit 170 via multiple terminals, including terminals 126, 127, and 128. The reference sensor 130 may also be coupled to the force sensing circuit 170 via multiple terminals, including terminals 126, 127, and 129. The reference sensor 130 may produce an output signal to the fourth terminal 129, where the output signal may indicate a reference capacitance of the reference sensor 130 for comparison against the output signal from the force sensor 120.

As illustrated in FIG. 1, The force sensing circuit 170 may include a signal generator 110 (also referred to as a TX force pattern generator) that generates a first signal (TX signal) on the first terminal 126 and a second (−TX signal) on the second terminal 127. The force sensing circuit 170 may be implemented in a microprocessor or central processing unit, a controller, a microcontroller, a special-purpose processor, a digital signal processor (DSP), an application specific integrated circuit (ASIC), a field programmable gate array (FPGA), or other processing components or devices.

In one embodiment, the reference sensor 130 may be positioned in a location of force sensing system 100 that is not subjected to forces applied to the touch panel by a touch object. For example, the reference sensor 130 may be located in an area of the housing of a touch panel device separate from the touch panel that is pressed by a user. The reference capacitor 132 may have a substantially similar capacitance (e.g., within +/−30%) to variable force sensing capacitor 122 when the touch panel device is at a steady state. For example, the touch panel device may be at a steady state when no force is being applied to the touch panel and when the touch panel device is not exposed to external forces. The baseline capacitor 135 may have a similar baseline value as baseline capacitor 125.

In one embodiment, K number of force sensors 120 may be used, where K is a positive integer. The force sensing circuit 170 may include K+1 number of receiver channels 150. For example, one of the receiver channels 150 may be used to measure the reference capacitance from the reference sensor 130 and the other K number of receiver channels 150 can respectively measure a capacitance of the respective one of the K number of force sensors 150. The force sensing circuit 170 may include a multiplexer 140 coupled to the K number of force sensor 120 via K number of terminals and coupled to the reference sensor 130 via the fourth terminal 129, resulting in K+1 number of inputs. The multiplexer 140 may receive the output signals from force sensors 120 and reference sensor 130 via the third terminal 128 and fourth terminal 129, respectively. The multiplexer 140 may be coupled to the K+1 number of receiver channels 150, where the value of K corresponds to the number of force sensors 120. For example, if the force sensing system 100 includes four force sensors 120, then the multiplexer 140 may be coupled to five (e.g., 4+1) receiver channels 150, where 4 of the receiver channels 150 are used to measure the output signals from the four force sensors 120 and one of the receiver channels 150 is used to measure the output signal from the reference sensor 130. The multiplexer 140 can be used to connect any one of the force sensors 120 and reference sensor 130 to any one of the receiver channels 150.

As illustrated in FIG. 1, each of the receiver channels 150 may include a current integrator that integrates a signal received from the respective force sensor 120 or reference sensor 130. The signal may be a current signal that represents a capacitance of the respective force sensor 120 or reference sensor 130. The current integrator may compare a voltage of the output signal received from the multiplexer 140 with a reference voltage. The reference voltage may be received from the reference sensor 130. Alternatively, the reference voltage may be generated by a power source in the force sensing circuit 170. Each of the receiver channels 150 are coupled to an analog-to-digital converter (ADC) 160 that can digitize the capacitance measured on the force sensors 120 and reference sensor 130. In some embodiments, the receiver channels 150 may be coupled to multiple ADCs 160. In one embodiment, the ADC 160 may receive the analog output signal and convert it into a digital signal that may be provided as force data to a processing component, such as a processor core, a central processing unit (CPU), a host processing circuit, or other digital signal processing (DSP) circuitry or logic. For example, the force data can be output to additional circuitry that detects touches and outputs touch data. The force data and the touch data can be utilized by the processing component for various applications. For example, the force sensing circuit 170 may use the analog signal from the force sensors 120 and the analog signal from the reference sensor 130 to measure a force value indicative of a force applied to the force sensors 120, where the force value does not include external forces being applied to the force sensing system 100. The force value can be output as a digital signal from the ADC 160. In other embodiments, the ADC 160 can output raw data from the force sensor(s) 120 and the reference sensor 130 for further processing by a processing component of the same integrated circuit as the force sensing circuit 170 or by a processing component of a separate integrated circuit, such as a host processor coupled to a processing device containing the force sensing circuit 170 and a capacitance measurement circuit described in more detail below.

Figure 2:
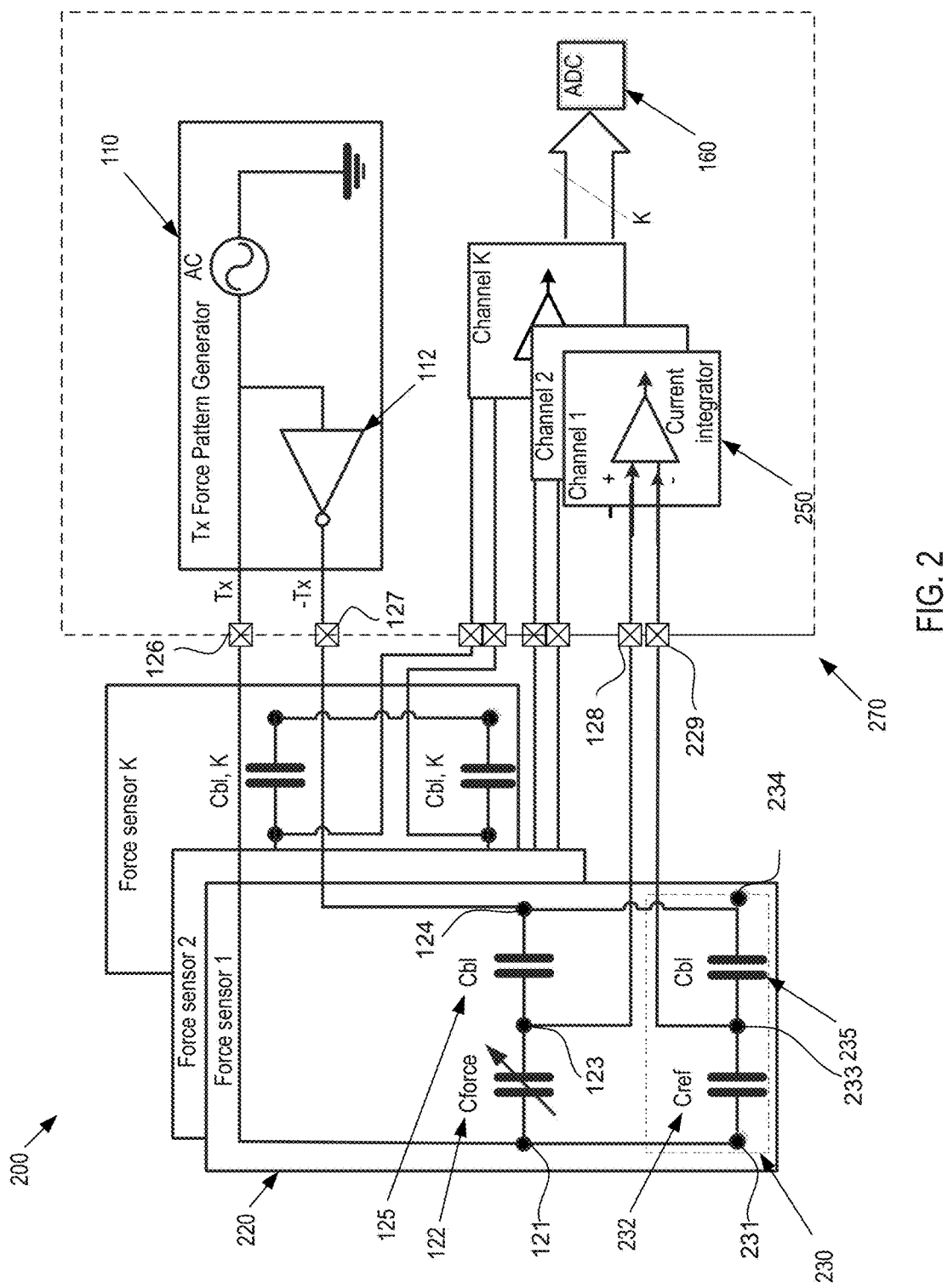
FIG. 2 is a diagram illustrating a force sensing system having multiple force sensors and multiple reference sensors, according to an embodiment.

FIG. 2 is a diagram illustrating a force sensing system 200 having multiple force sensors and multiple reference sensors, according to an embodiment. Force sensing system 200 is similar to the force sensing system 100 as noted by similar reference labels except where expressly noted. The signal generator 110, via the first terminal 126 and the second terminal 127, may be configured to couple to one or more force sensors 220. Instead of using one reference sensor 130 with multiple force sensors 120, each of the force sensors 220 includes its own reference sensor 230, resulting in multiple reference sensors 230. In some embodiments, each force sensor 220 may have an integrated reference sensor 230. Each of the reference sensors 230 is similar to the reference sensor 130, but each of the reference sensors 230 is integrated or disposed in connection with each of the force sensors 220. In one embodiment, the force sensors 220 may be located at various locations on a touch panel of a touch panel device.

As illustrated in FIG. 2, each of the reference sensors 230 includes a fourth node 231 and a fifth node 233 separated by a reference capacitor 232 (Cref) formed by a ninth electrode and a tenth electrode. The fifth node 233 and a sixth node 234 are separated by a baseline capacitor 235 (Cbl) formed by an eleventh electrode and a twelfth electrode. The fourth node 231 is coupled to the first terminal 126, the fifth node 234 is coupled to the second terminal 127, and the sixth node 233 is coupled to a fourth terminal 229. The nodes 231, 233, and 234 and terminals 126, 127, and 229 can be said to be configured in a half-bridge circuit. The full-bridge circuit of the force sensor 220 (with the integrated reference sensor 230) can be used to minimize internal noise floor of the silicon and voltage supply noise. The reference sensor 230 can be used to reduce noise introduced by accelerations and vibrations for each of the multiple force sensors 220. The proposed embodiments can be used with force sensing methods that result in a large SNR and a large force sensing resolution. The force sensing capacitor 122 represents the variable capacitance that can be measured in response to force applied to the force sensor 220, whereas the baseline capacitor 125 represents a fixed capacitance that is used to generate a baseline signal using a signal from a signal generator, as described below in more detail. The reference capacitor 232 represents a reference capacitance and the baseline capacitor 235 represents the fixed capacitance that is used to generate a baseline signal using a signal from the signal generator. The force sensor 220 may produce an output signal to the third terminal 128, where the output signal may indicate a change in capacitance of the force sensor, as represented by the variable capacitor 122 described above.

In one embodiment, the reference sensors 230 may be positioned in a location of force sensing system 200 that is not subjected to forces applied to the touch panel by a touch object. For example, the reference sensor 230 may be located in an area of the housing of a touch panel device separate from the touch panel that is pressed by a user. The reference capacitor 232 may have a substantially similar capacitance (e.g., within +/−30%) to variable force sensing capacitor 122 when the touch panel device is at a steady state. For example, the touch panel device may be at a steady state when no force is being applied to the touch panel and when the touch panel device is not exposed to external forces. The baseline capacitor 235 may have a similar baseline value as baseline capacitor 125.

In one embodiment, the force sensing system 200 includes K number of force sensors 220, where K is a positive integer, and a force sensing circuit 270. The force sensing circuit 270 is similar to the force sensing circuit 170 as noted by similar reference labels except where expressly noted. The force sensing circuit 270 may include K number of receiver channels 250. Each of the receiver channels 250 receives two signals from each of the force sensors 220, including a reference signal from the reference sensor 230. The receiver channel 250 may be used to measure a difference between a first signal from the node 123 and a reference signal from the node 233 of the reference sensor 230. The first signal is representative of a capacitance of the force sensor and reference signal is representative of a reference capacitance of the corresponding reference sensor 230. In some embodiments, each of the receiver channels 250 of the force sensing circuit 270 may be coupled to corresponding force sensors 220. Alternatively, a multiplexer could be used to couple any one of the force sensors 220 to any one of the receiver channels 250. For example, if the force sensing system 200 includes four force sensors 220, then the four force sensors 220 are individually coupled to four receiver channels 250.

As illustrated in FIG. 2, each of the receiver channels 250 may include a current integrator that integrates a pair of signals received from the respective force sensor 220. The current integrator may compare a voltage of the output signal received from the node 123 with a reference signal received from the node 233. Each of the receiver channels 250 may be coupled to one or more ADCs 160 that can digitize the capacitance measured on the force sensors 220.

Figure 3:
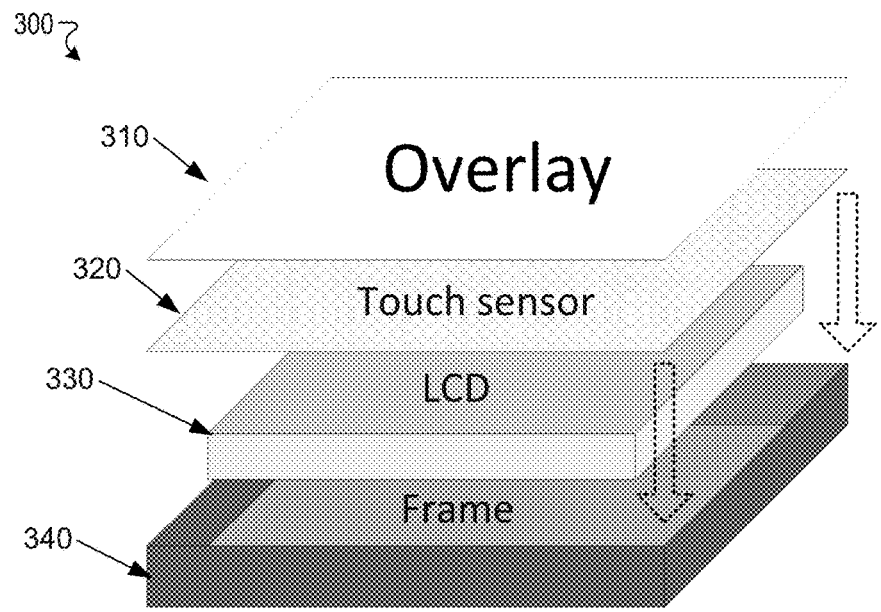
FIG. 3 illustrates an isometric view of a touch panel device in which embodiments are implemented.

FIG. 3 illustrates an isometric view of a touch panel device 300 in which embodiments are implemented. The touch panel device 300 may include an overlay 310, a touch sensor 320, a liquid crystal display (LCD) 330 and a frame 340. The overlay 310 may be a rigid cover of the touch panel device 300 and may be formed from glass, plastic or other similar materials. The touch sensor 320 may include electrodes whose capacitance may change in response to the presence of a touch object, such as a finger of a user. The LCD 330 may display a graphical user interface (GUI) to a user of the touch panel device 300. The frame 340 may serve as a housing for the overlay 310, the touch sensor 320 and the LCD. In one embodiment, the touch sensor 320 and the LCD 330 may be attached to the bottom surface of the overlay 310. In another embodiment, the touch sensor 320 and the LCD 330 may be attached to the upper surface of frame 340 and located below, but not in contact with, the overlay 310.

Figure 4:
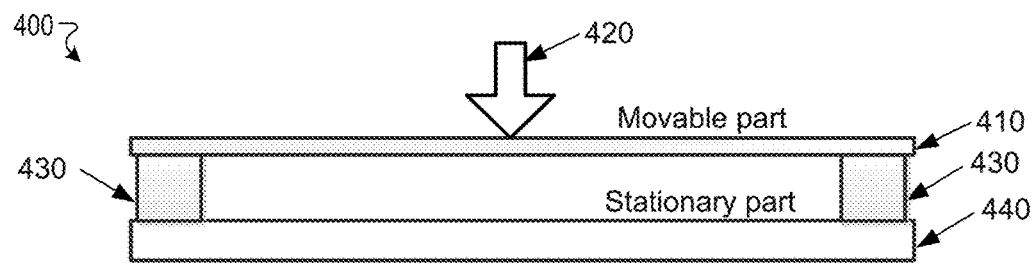
FIG. 4 illustrates a cross-sectional view of a force being applied to a touch panel device, according to one embodiment.

FIG. 4 illustrates a cross-sectional view of a force being applied to a touch panel device 400 according to one embodiment. The touch panel device 400 may include an overlay 410 and a frame 440 that correspond to overlay 310 and frame 340 of FIG. 3, respectively. For clarity, touch sensor 320 and LCD 330 are not shown. The overlay 410 may be coupled to the frame 440 using elastic components 430. The elastic components 430 may include elastic tape, rubber foam, or any suitable material. In some embodiments, various configurations of elastic components 430 may be used to couple the overlay 410 to the frame 440, as will be described in more detail in FIGS. 5 and 6. However, the elastic components 430 may take a certain amount of time to return to their original position, which may result in memory effect on the force where the touch panel device may falsely identify a force being exerted on the touch panel due to the touch panel not returning to its original geometry within the certain amount of time.

Force sensors (not shown), such as force sensors 120 and 220 of FIGS. 1 and 2, respectively, may be attached to the overlay 410 and may vary in capacitance based on a change in distance between the overlay 410 and the frame 440, as previously discussed. One or more reference sensors (not shown), such as reference sensors 130 and 230 of FIGS. 1 and 2, respectively, may be attached to the frame 440. A force 420 may be applied to the overlay 410. The force 420 may be transferred from the overlay 410 to the elastic components 430, resulting in a compression of elastic components 430. After the force 420 has been removed from the overlay 410, the elastic components 430 may return to their original position.

Figure 5A:
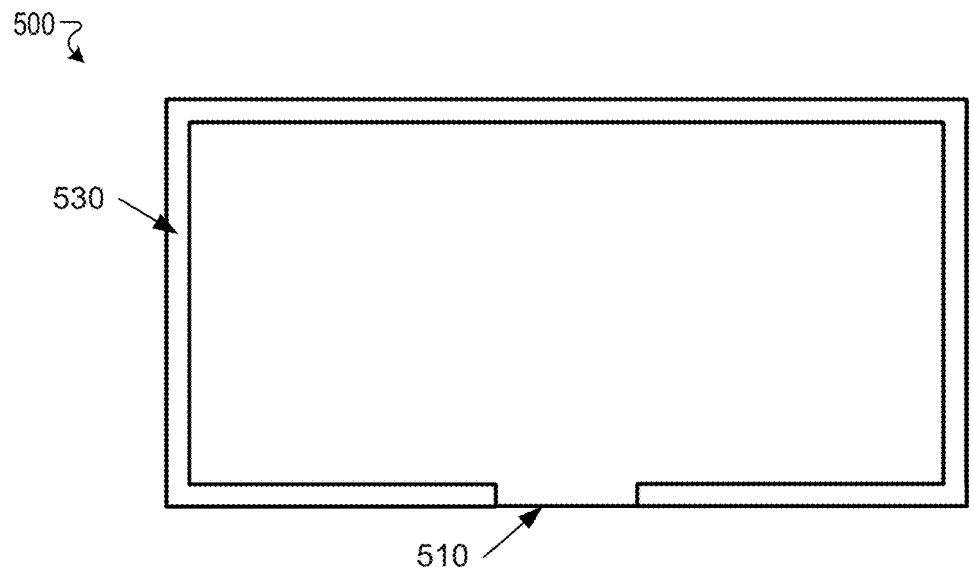
FIG. 5A illustrates a touch panel device having elastic components attached to the perimeter of an overlay according to one embodiment.
Figure 5B:
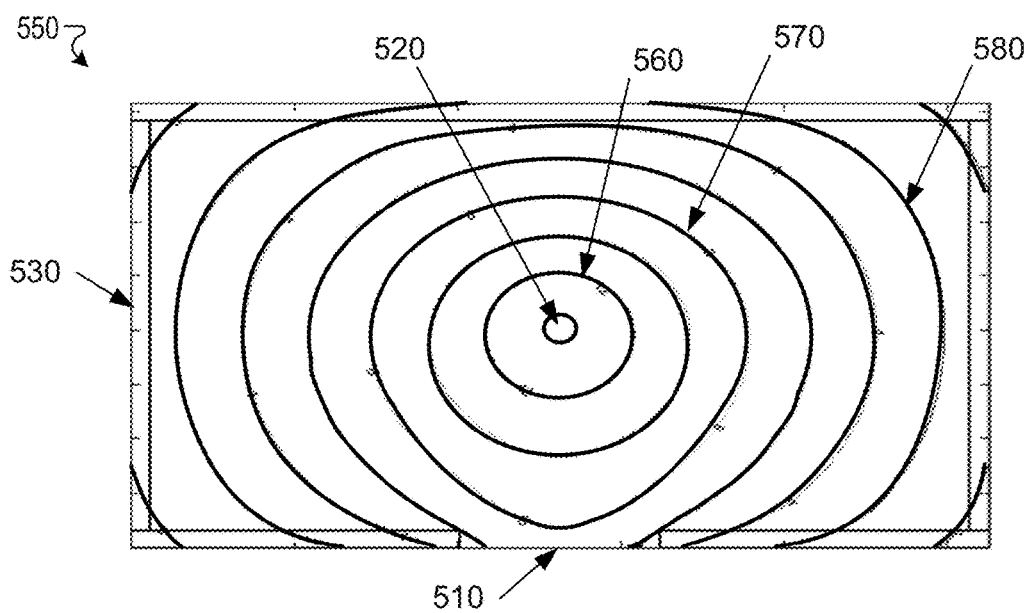
FIG. 5B is an illustration of the displacement of the overlay in response to a force being applied, according to an embodiment.

FIG. 5A illustrates a touch panel device 500 having elastic components coupled to the perimeter of an overlay, according to an embodiment. The touch panel device 500 may include an overlay 510 that may correspond to overlay 310 of FIG. 3. Elastic components 530, such as elastic components 430 of FIG. 4, may be coupled to the perimeter of the overlay 510 having a gap in a portion of elastic components 430 near the bottom of the overlay 510. FIG. 5B is an illustration 550 of the displacement of the overlay 510 in response to a force being applied. Elastic components 530 may be coupled to the bottom surface of overlay 510, as described in FIG. 5A. A force may be applied to the overlay 510 at position 520 near the center of the overlay 510. Curves 560, 570 and 580 may represent the change in topology that corresponds to a displacement of the overlay 510 in response to the force being applied at position 520. The displacement of the overlay 510 may be greater at curve 560 and may decrease at curve 570 and may decrease further at curve 580. In the present configuration, the displacement of the overlay 510 may exhibit non-linear displacement in response to the force being applied to the overlay 510. Furthermore, due to the elastic components 530 being present along a majority of the perimeter of overlay 510, the displacement of the overlay 510 may be relatively small in response to the force.

Figure 6A:
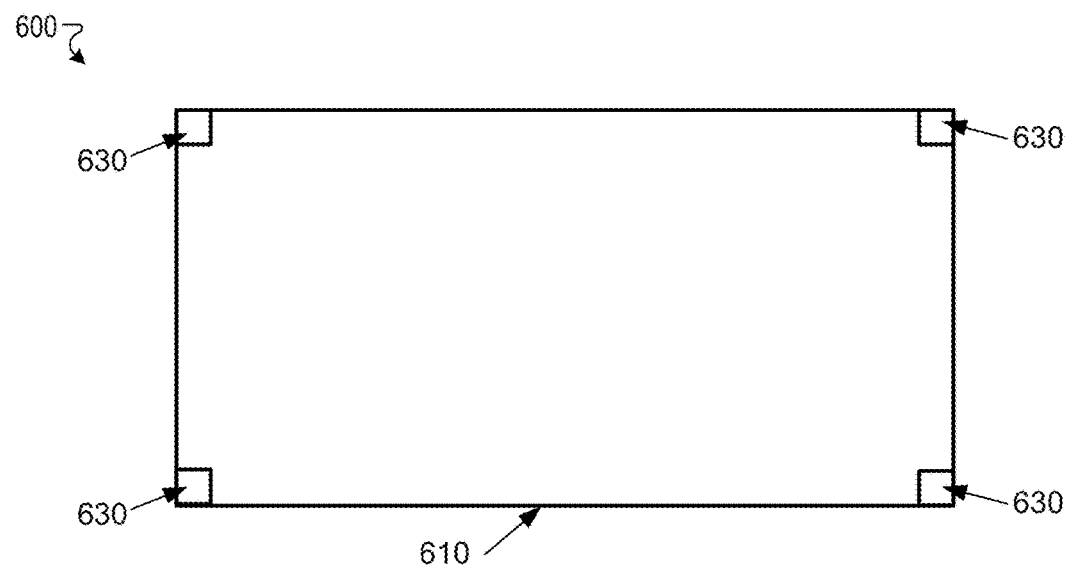
FIG. 6A illustrates a touch panel device having elastic components attached to the corners of the perimeter of an overlay, according to another embodiment.
Figure 6B:
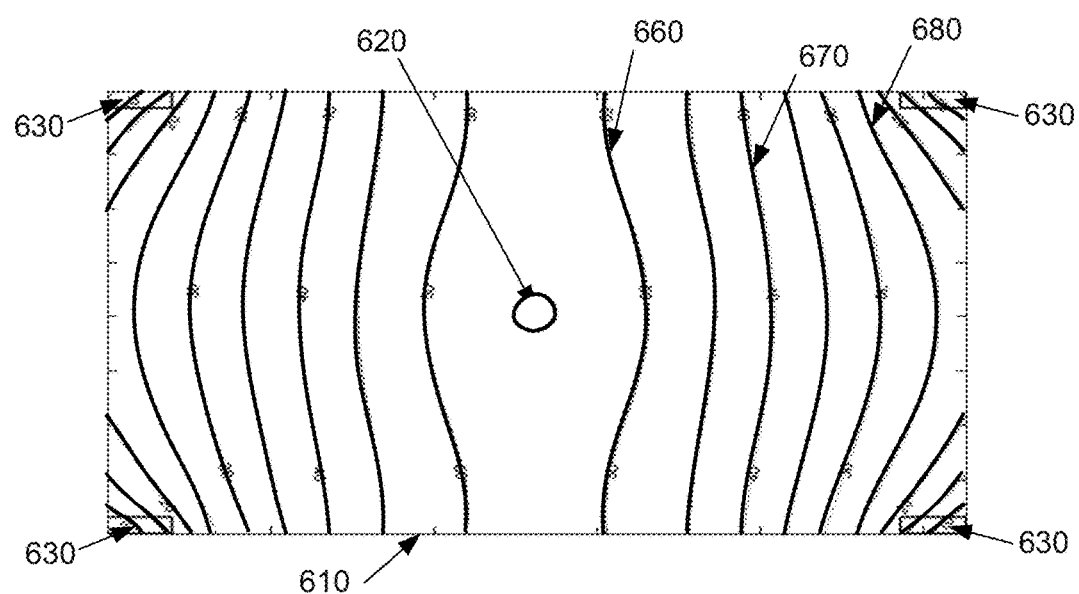
FIG. 6B is an illustration of the displacement of the overlay in response to a force being applied, according to one embodiment.

FIG. 6A illustrates a touch panel device 600 having elastic components coupled to the corners of the perimeter of an overlay, according to an embodiment. The touch panel device 600 may include an overlay 610 that may correspond to overlay 310 of FIG. 3. Elastic components 630, such as elastic components 430 of FIG. 4, may be coupled to the corners of the perimeter of the overlay 610. FIG. 6B is an illustration 650 of the displacement of the overlay 610 in response to a force being applied. Elastic components 630 may be coupled to the bottom surface of overlay 610, as described in FIG. 6A. A force may be applied to the overlay 610 at position 620 near the center of the overlay 610. Curves 660, 670 and 680 may represent the change in topology that corresponds to a displacement of the overlay 610 in response to the force being applied at position 620. The displacement of the overlay 610 may be greater at curve 660 and may decrease at curve 670 and may decrease further at curve 680. In the present configuration, the displacement of the overlay 610 may exhibit linear displacement in response to the force being applied to the overlay 610. Furthermore, due to the elastic components 630 being present in the corners of the perimeter of overlay 610, the displacement of the overlay 610 may be relatively large in response to the force.

Figure 7:
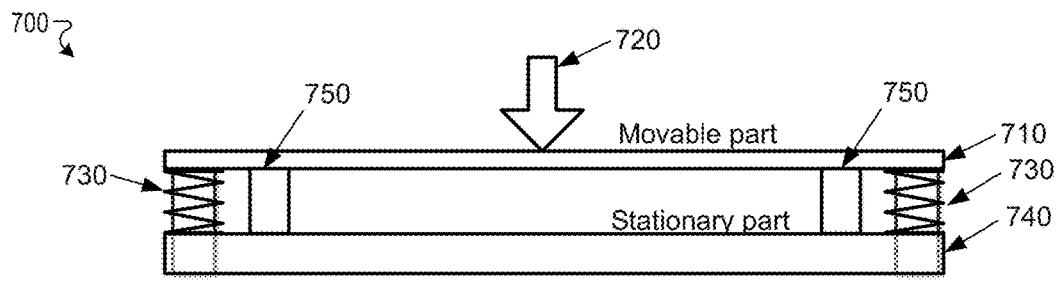
FIG. 7 illustrates a cross-sectional view of a touch panel device including coil springs to couple an overlay to a frame, according to an embodiment.

FIG. 7 illustrates a cross-sectional view of a touch panel device 700 including coil springs to couple an overlay to a frame, according to an embodiment. The touch panel device 700 may include an overlay 710 and a frame 740 that correspond to overlay 310 and frame 340 of FIG. 3, respectively. For clarity, touch sensor 320 and LCD 330 are not shown. The touch panel device 700 may include a set of coil springs 730 that couple the overlay 710 to the frame 740. When force 720 is applied to overlay 710, coil springs 730 compress and the distance between the overlay 710 and the frame 740 decreases, as discussed in FIG. 4. When force 720 is removed, the coil springs 730 may return to their original position and the distance between the overlay 710 and the frame 740 may return to its original value. The coil springs 730 may return to their original position more quickly than the elastic components 430 of FIG. 4, reducing memory effect. In some embodiments, both coil springs 730 and elastic components 430 may be used to reduce memory effect and improve vibration suppression. For example, the touch panel device 700 may include elastic components 750 that are coupled to the bottom surface of overlay 710 and the top surface of frame 740 and may correspond to elastic components 430 of FIG. 4. As previously discussed, the coil springs 730 may have a quick response to a mechanical load (e.g., force) and return to their original position more quickly than elastic components 750, reducing memory effect, but having little effect on the suppression of vibrations. Conversely, the elastic components 750 may suppress vibrations but do not reduce memory effect. Therefore, using both coil springs 730 and elastic components 750 in parallel in a touch panel device 700 may minimize the memory effect, but also suppress vibrations.

Figure 8:
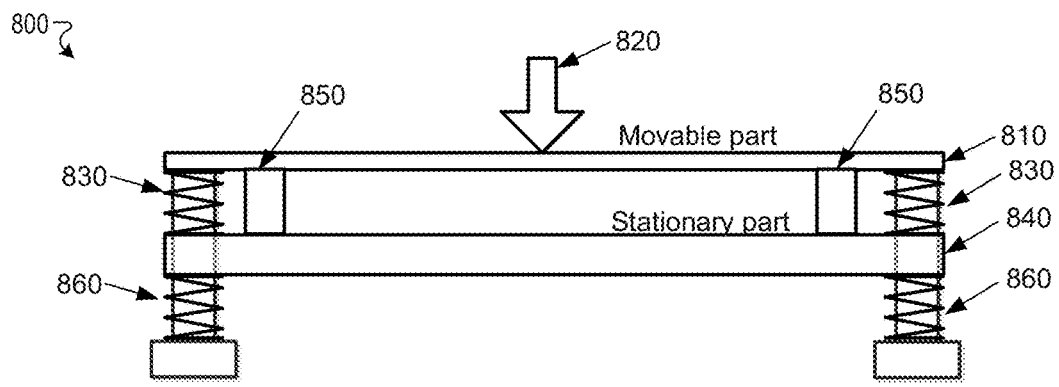
FIG. 8 illustrates a cross-sectional view of a touch panel device including coil springs to adjust a frame of the touch panel device, according to an embodiment.

FIG. 8 illustrates a cross-sectional view of a touch panel device 800 including coil springs to adjust a frame of the touch panel device 800, according to an embodiment. The touch panel device 800 may include an overlay 810 and a frame 840 that correspond to overlay 310 and frame 340 of FIG. 3, respectively. For clarity, touch sensor 320 and LCD 330 are not shown. The touch panel device 800 may include a first set of coil springs 830 that couple the overlay 810 to the frame 840 and a second set of coil springs 860 located below the frame 840. When force 820 is applied to overlay 810, coil springs 830 may compress and the distance between the overlay 810 and the frame 840 may decrease, as discussed in FIG. 4. When force 820 is removed, the coil springs 830 may return to their original position and the distance between the overlay 810 and the frame 840 may return to its original value.

As previously discussed, force sensors may have a capacitance value that is based on the distance between the overlay 810 and the frame 840. For example, if the overlay 810 is tilted in relation to the frame 840, then a force sensor coupled at one end of the overlay 810 may have a different capacitance than a force sensor coupled at the other end of the overlay 810. Therefore, it may be advantageous to allow for adjustment of the distance between the overlay 810 and the frame 840 in order for the capacitance of the force sensors to be substantially similar. The tension of each coil spring 860 may be selectively adjusted to raise or lower frame 840, resulting in a uniform distance between overlay 810 and frame 840. In some embodiments, the touch panel device 800 may include elastic components 850 that are coupled to the bottom surface of overlay 810 and the top surface of frame 840 and may correspond to elastic components 430 of FIG. 4.

Figure 9:
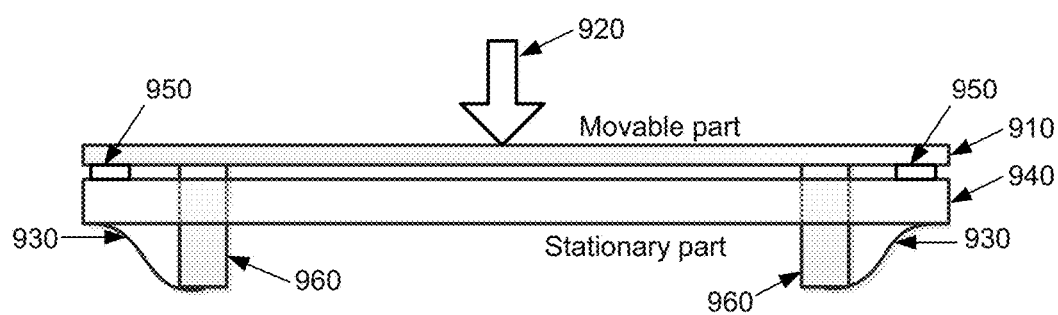
FIG. 9 illustrates a cross-sectional view of a touch panel device including leaf springs, according to an embodiment.

FIG. 9 illustrates a cross-sectional view of a touch panel device 900 including leaf springs, according to an embodiment. The touch panel device 900 may include an overlay 910 and a frame 940 that correspond to overlay 310 and frame 340 of FIG. 3, respectively. For clarity, touch sensor 320 and LCD 330 are not shown. The touch panel device 900 may include pillars 960 that are coupled to the bottom surface of overlay 910. The pillars 960 may be formed of a rigid material, such as glass, plastic or other suitable materials. The pillars 960 may pass through holes in the frame 940 and attach to a set of leaf springs 930 that are coupled to the frame 940. Each leaf spring 930 may include one or more layers of material formed into an elliptical shape that compress when a force is applied. When force 920 is applied to overlay 910, leaf springs 930 may compress and the distance between the overlay 910 and the frame 940 may decrease, as discussed in FIG. 4. When force 920 is removed, the leaf springs 930 may return to their original position and the distance between the overlay 910 and the frame 940 may return to its original value. In some embodiments, the touch panel device 900 may include elastic components 950 that are coupled to the bottom surface of overlay 910 and the top surface of frame 940 and may correspond to elastic components 430 of FIG. 4.

Figure 10:
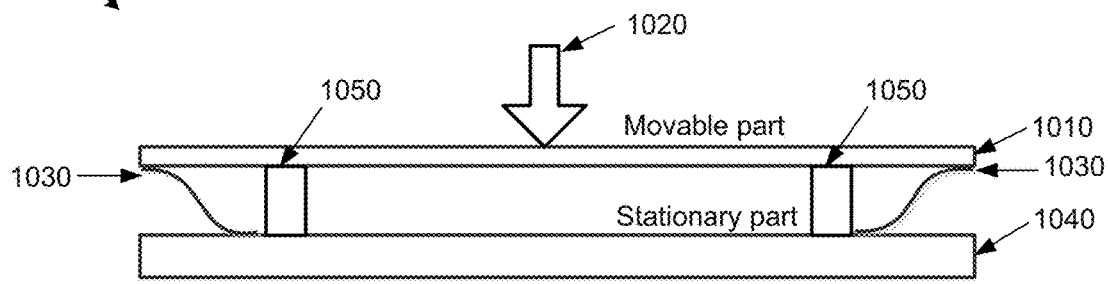
FIG. 10 illustrates a cross-sectional view of a touch panel device including leaf springs, according to an embodiment.

FIG. 10 illustrates a cross-sectional view of a touch panel device 1000 including leaf springs, according to an embodiment. The touch panel device 1000 may include an overlay 1010 and a frame 1040 that correspond to overlay 310 and frame 340 of FIG. 3, respectively. For clarity, touch sensor 320 and LCD 330 are not shown. The touch panel device 1000 may include a set of leaf springs 1030 that couple the overlay 1010 to the frame 1040. When force 1020 is applied to overlay 1010, leaf springs 1030 may compress and the distance between the overlay 1010 and the frame 1040 may decrease, as discussed in FIG. 4. When force 1020 is removed, the leaf springs 1030 may return to their original position and the distance between the overlay 1010 and the frame 1040 may return to its original value. In some embodiments, the touch panel device 1000 may include elastic components 1050 that are coupled to the bottom surface of overlay 1010 and the top surface of frame 1040 and may correspond to elastic components 430 of FIG. 4.

Figure 11A:
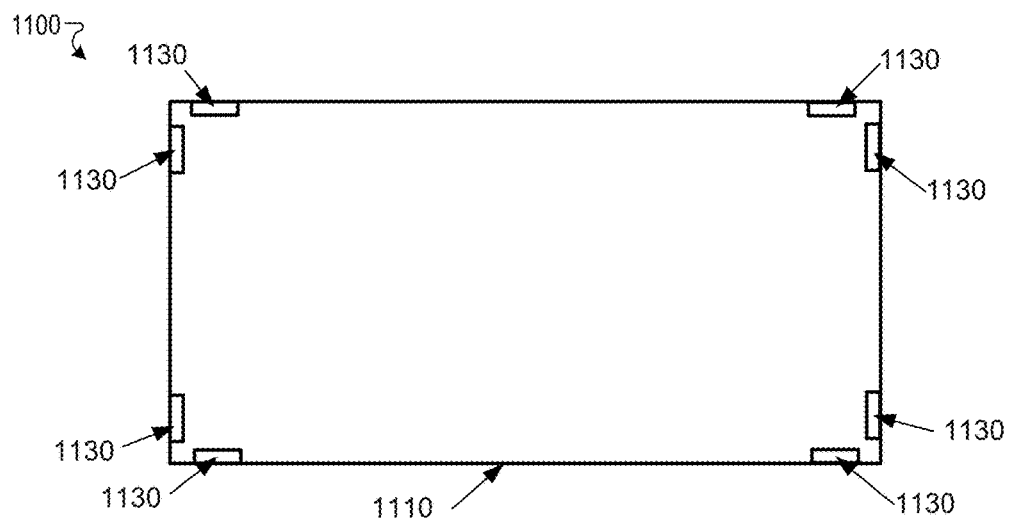
FIG. 11A illustrates a touch panel device having leaf springs attached to the corners of the perimeter of an overlay, according to an embodiment.
Figure 11B:
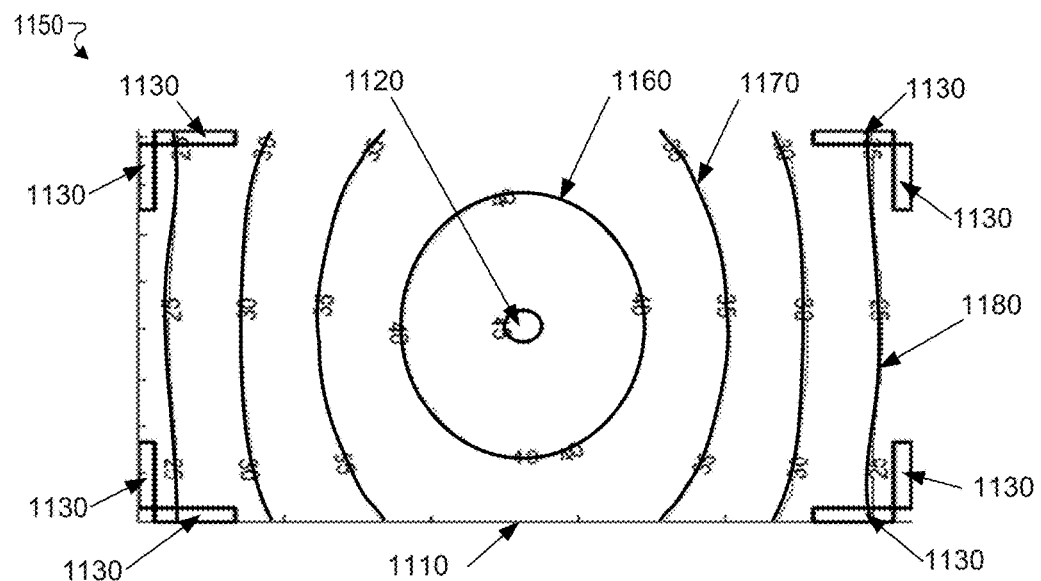
FIG. 11B is an illustration of the displacement of the overlay in response to a force being applied, according to one embodiment.

FIG. 11A illustrates a touch panel device 1100 having leaf springs coupled to the corners of the perimeter of an overlay, according to an embodiment. The touch panel device 1100 may include an overlay 1110 that may correspond to overlay 310 of FIG. 3. Leaf springs 1130, such as leaf springs 930 of FIG. 9, may be coupled at the corners of the perimeter of the overlay 1110. FIG. 11B is an illustration 1150 of the displacement of the overlay 1110 in response to a force being applied. Leaf springs 1130 may be coupled to the bottom surface of overlay 1110, as described in FIG. 11A. A force may be applied to the overlay 1110 at position 1120 near the center of the overlay 1110. Curves 1160, 1170 and 1180 may represent the change in topology that corresponds to a displacement of the overlay 1110 in response to the force being applied at position 1120. The displacement of the overlay 1110 may be greater at curve 1160 and may decrease at curve 1170 and may decrease further at curve 1180. In the present configuration, the displacement of the overlay 1110 may exhibit linear displacement in response to the force being applied to the overlay 1110. Furthermore, the use of leaf springs 1130 may reduce memory effect of the touch panel device 1100.

Figure 12:
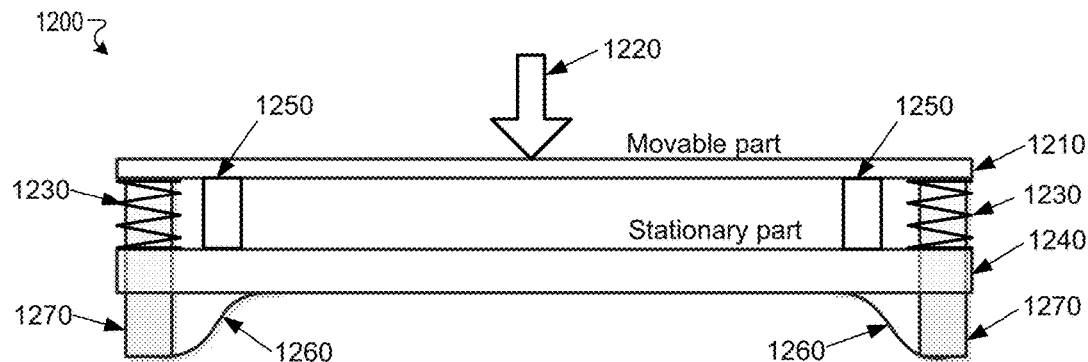
FIG. 12 illustrates a cross-sectional view of a touch panel device including coil springs to couple an overlay to a frame and leaf springs coupled to the frame, according to an embodiment.

FIG. 12 illustrates a cross-sectional view of a touch panel device 1200 including coil springs to couple an overlay to a frame and leaf springs coupled to the frame, according to an embodiment. The touch panel device 1200 may include an overlay 1210 and a frame 1240 that correspond to overlay 310 and frame 340 of FIG. 3, respectively. For clarity, touch sensor 320 and LCD 330 are not shown. The touch panel device 1200 may include a set of coil springs 1230 that couple the overlay 1210 to the frame 1240 and a set of leaf springs 1260 coupled to the bottom surface of the frame 1240 and pillars 1270. When force 1220 is applied to overlay 1210, coil springs 1230 may compress and the distance between the overlay 1210 and the frame 1240 may decrease, as discussed in FIG. 4. When force 1220 is removed, the coil springs 1230 may return to their original position and the distance between the overlay 1210 and the frame 1240 may return to its original value. However, the use of leaf springs 1260 may make it difficult to tune the clearance between the overlay 1210 and the frame 1240. In some embodiments, the touch panel device 1200 may include elastic components 1250 that are coupled to the bottom surface of overlay 1210 and the top surface of frame 1240 and may correspond to elastic components 430 of FIG. 4.

Figure 13:
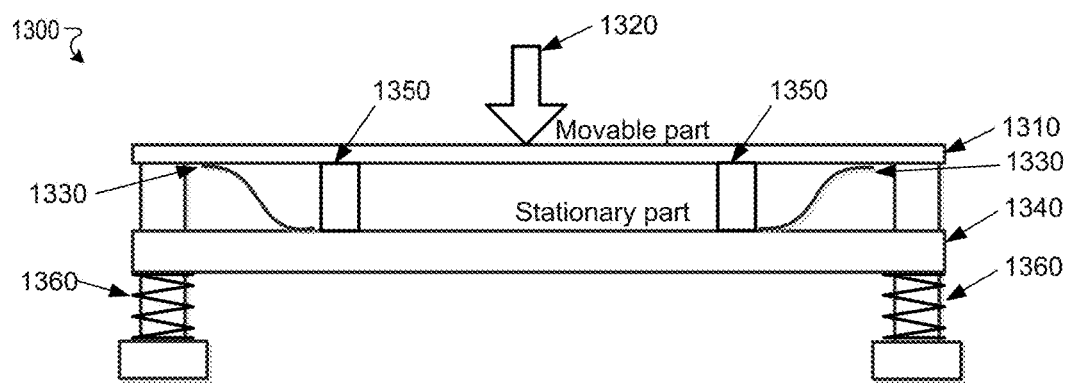
FIG. 13 illustrates a cross-sectional view of a touch panel device including leaf springs to couple an overlay to a frame and coil springs to adjust the frame to tune the clearance of the overlay, according to an embodiment.

FIG. 13 illustrates a cross-sectional view of a touch panel device 1300 including leaf springs to couple an overlay to a frame and coil springs to adjust the frame to tune the clearance of the overlay, according to an embodiment. The touch panel device 1300 may include an overlay 1310 and a frame 1340 that correspond to overlay 310 and frame 340 of FIG. 3, respectively. For clarity, touch sensor 320 and LCD 330 are not shown. The touch panel device 1300 may include a set of leaf springs 1330 that couple the overlay 1310 to the frame 1340 and a set of coil springs 1360 below the frame 1340. When force 1320 is applied to overlay 1310, leaf springs 1330 may compress and the distance between the overlay 1310 and the frame 1340 may decrease, as discussed in FIG. 4. When force 1320 is removed, the leaf springs 1330 may return to their original position and the distance between the overlay 1310 and the frame 1340 may return to its original value. The tension of each coil spring 1360 may be selectively adjusted to raise or lower frame 1340, resulting in a uniform distance between overlay 1310 and frame 1340, as discussed in FIG. 8. In some embodiments, the touch panel device 1300 may include elastic components 1350 that are coupled to the bottom surface of overlay 1310 and the top surface of frame 1340 and may correspond to elastic components 430 of FIG. 4.

Figure 14:
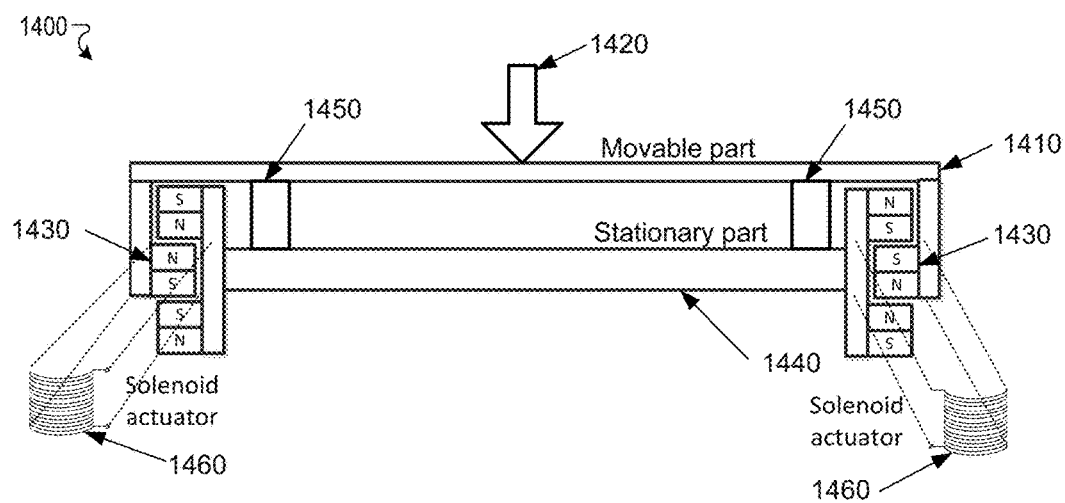
FIG. 14 illustrates a cross-sectional view of a touch panel device including magnetic springs, according to embodiments.

FIG. 14 illustrates a cross-sectional view of a touch panel device 1400 including magnetic springs, according to an embodiment. The touch panel device 1400 may include an overlay 1410 and a frame 1440 that correspond to overlay 310 and frame 340 of FIG. 3, respectively. For clarity, touch sensor 320 and LCD 330 are not shown. The touch panel device 1400 may include a set of magnetic springs 1430 that couple the overlay 1410 to the frame 1440. Each magnetic spring 1430 may have magnetic poles that repel one another. When force 1420 is applied to overlay 1410, magnetic springs 1430 may compress and the distance between the overlay 1410 and the frame 1440 may decrease, as discussed in FIG. 4. When force 1420 is removed, the magnetic repulsion of the poles of magnetic springs 1430 may cause the overlay 1410 to return to its original position and the distance between the overlay 1410 and the frame 1440 may return to its original value. In one embodiment, solenoids 1460 may be coupled to the magnetic springs 1430 to produce haptic feedback to the overlay 1410, as will be discussed in more detail in FIGS. 26 and 27. In some embodiments, the touch panel device 1400 may include elastic components 1450 that are coupled to the bottom surface of overlay 1410 and the top surface of frame 1440 and may correspond to elastic components 430 of FIG. 4.

FIG. 15 is an illustration of two types of force sensors 1500 and 1550 that may be implemented in embodiments. Force sensors 1500 and 1550 may be coupled to overlay 1510 and/or frame 1540. Overlay 1510, touch sensor 1520 and frame 1540 may correspond to overlay 310, touch sensor 320 and frame 340 of FIG. 3, respectively. In implementations, force sensors 1500 and/or 1550 may be used as force sensors 120 and reference sensor 130 of FIG. 1.

Force sensor 1500 may be a parallel plate force sensor that includes a first electrode 1530 that may be coupled to the bottom surface of frame 1540. Force sensor 1500 may also include a second electrode 1535 that may be coupled to the upper surface of the overlay 1510. As previously discussed, when a force is applied to the overlay 1510, the distance between first electrode 1535 and second electrode 1530 may increase or decrease, which may cause a change in capacitance of force sensor 1500. In some embodiments, a damper material (not shown) may be disposed between the first electrode 1530 and the second electrode 1535 of force sensor 1500. The damper material may be formed of a pressure sensitive viscoelastic polymer and may suppress vibration oscillations, increase force sensor 1500 sensitivity and protect force sensor 1500 from humidity.

Force sensor 1550 may be a planar force sensor that includes a first electrode 1530 and a second electrode 1535. In force sensor 1550, both the first electrode 1530 and the second electrode 1535 may be coupled to the upper surface of the overlay 1510 or the frame 1540. The first electrode 1530 and the second electrode 1535 may each have a combed shape and may be interleaved with one another. The first electrode 1530 and the second electrode 1535 may be sensitive to the presence of grounded objects. When a grounded object, such as frame 1540, approaches the first electrode 1530 and the second electrode 1535 of force sensor 1550, the capacitance may change. For example, when a force is applied the overlay 1510, the distance between the overlay 1510 and the frame 1540 may change, causing a decrease or increase in capacitance of force sensor 1550. In some embodiments, a damper material (not shown) may be disposed between electrodes 1530 and 1535 of force sensor 1550 and the frame 1540. The damper material may be formed of a pressure sensitive viscoelastic polymer and may suppress vibration oscillations, increase force sensor 1550 sensitivity and protect force sensor 1550 from humidity.

Figure 16B:
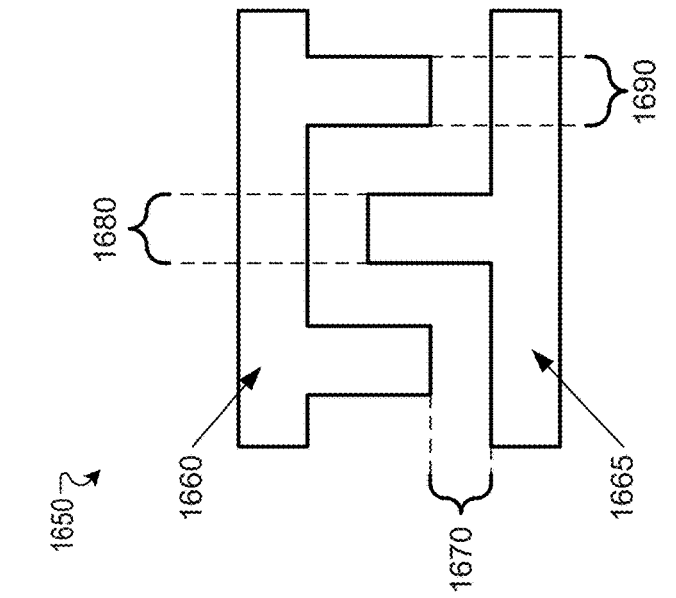
FIG. 16B is an illustration of determining optimal dimensions of electrodes of a force sensor, according to some embodiments.
Figure 16A:
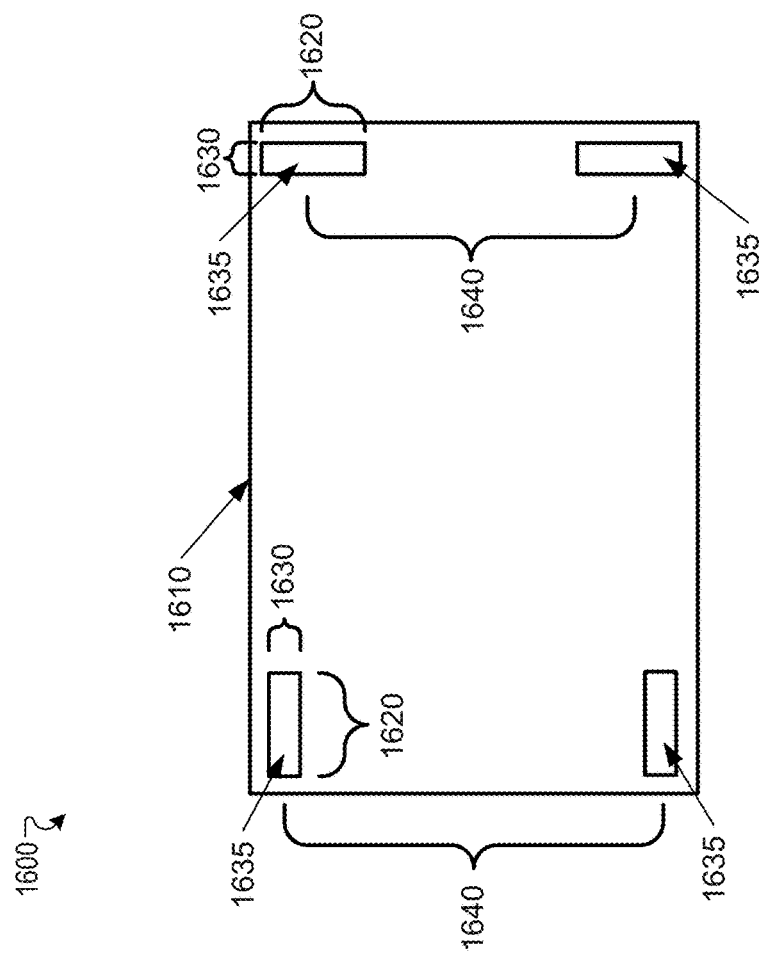
FIG. 16A is an illustration of determining optimal dimensions of electrodes of a force sensor, according to embodiments.

FIG. 16A is an illustration 1600 of determining optimal dimensions of electrodes 1530 and 1535 of force sensor 1500, according to embodiments. Electrodes 1635 may correspond to electrodes 1530 and 1535 of FIG. 15A. Overlay 1610 may correspond to overlay 310 of FIG. 3. Electrodes 1635 may be coupled to the bottom surface of overlay 1610. A corresponding electrode (not shown) may be placed at a corresponding position on the top surface of the frame below each of the electrodes 1635. Each electrode 1635 may have a length 1620 and a height 1630. As the area of the electrodes 1635 increases, the signal-to-noise ratio (SNR) of the electrodes 1635 may also increase. Furthermore, there may be a determined distance 1640 between the center of one electrode 1635 and an adjacent electrode 1635. As the determined distance 1640 increases, the force estimation error of a touch panel device may decrease. The length 1620, height 1630 and distance 1640 of the electrodes 1635 may be determined by selecting a fixed value for the height 1630 of the electrodes. Using the fixed value for the height 1630, a ratio of length 1620 to distance 1640 may be used to determine the recommended length 1620 and distance 1640 of the electrodes 1635. In one embodiment, the ratio of length 1620 to distance 1640 may be determined based a force estimation algorithm and noise floor in order to maximize the SNR while minimizing the force estimation error. For example, using a fixed value for the height 1630 of 12.5 millimeters (mm), the recommended length 1620 may be 25 mm and the recommended distance 1640 may be 135 mm.

FIG. 16B is an illustration 1600 of determining optimal dimensions of electrodes 1530 and 1535 of force sensor 1550, according to embodiments. Electrodes 1660 and 1665 may correspond to electrodes 1530 and 1535 of FIG. 15B, respectively. Electrodes 1660 and 1665 may have corresponding widths 1680 and 1690, respectively. A gap 1670 that does not contain conductive material may be present between electrode 1660 and 1665. In one embodiment, the gap 1670 and widths 1680 and 1690 may be equal in value. For example, the gap 1670 and widths 1680 and 1690 may be 0.35 mm. In some embodiments, different orientations, shapes and configurations of electrodes 1660 and 1665 may be used.

Figure 17:
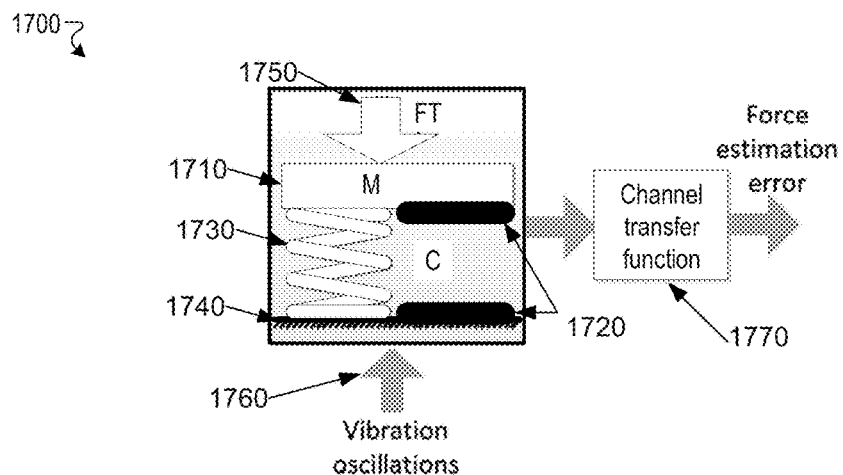
FIG. 17 is a cross-sectional view of a portion of a touch panel device, according to embodiments.

FIG. 17 is a cross-sectional view of a portion of a touch panel device 1700, according to embodiments. The touch panel device 1700 may include an overlay 1710, a force sensor 1720, a coil spring 1730 and a frame 1740. The overlay 1710 and frame 1740 may be representative of overlay 310 and frame 340 of FIG. 3, respectively. The force sensor 1720 may be representative of force sensor 120 of FIG. 1. The coil spring 1730 may be representative of coil spring 730 of FIG. 7.

As previously discussed, when a force 1750 is applied to overlay 1710, the distance between overlay 1710 and frame 1740 may change. The change in distance may cause a change in capacitance of the force sensor 1720 that may be correlated to the force 1750 applied to the overlay 1710. However, the touch panel device 1700 may be subject to external forces that are not associated with force 1750, such as vibrations 1760. The vibrations 1760 may similarly change the distance between the overlay 1710 and the frame 1740, which may change the capacitance of force sensor 1720. Therefore, an output signal from force sensor 1720 may include a change in capacitance that is caused not only by force 1750, but also by vibrations 1760. A transfer function 1770 may be performed on the output signal from the force sensor 1720 to allow a force sensing circuit to generate a force value associated with the change in capacitance. However, the force value may not be an accurate representation of the force 1750 applied to overlay 1710 because the output signal includes the change in capacitance from the force 1750 and vibrations 1760. Therefore, it may be advantageous to suppress changes in capacitance caused by vibration 1760 to generate a more accurate force value that correlates to force 1750.

Figure 18:
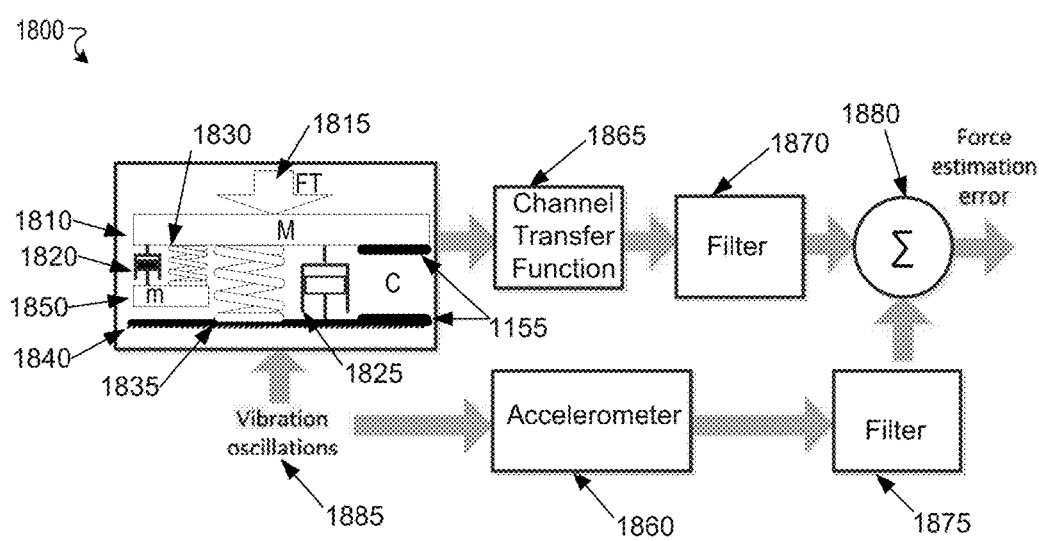
FIG. 18 illustrates a system for suppressing vibrations applied to a touch panel device, according to some embodiments.

FIG. 18 illustrates a system 1800 for suppressing vibrations applied to a touch panel device, according to embodiments. The system 1800 may include an overlay 1810, a force sensor 1855, coil springs 1830 and 1835, dampers 1820 and 1825, a weight 1850 and a frame 1840. The overlay 1810 and frame 1840 may be representative of overlay 310 and frame 340 of FIG. 3, respectively. The force sensor 1855 may be representative of force sensor 120 of FIG. 1. Coil springs 1830 and 1835 may be representative of coil spring 730 of FIG. 7. Although the present embodiment includes coil springs 1830 and 1835, other embodiments may include leaf springs, magnetic springs, solenoids or any suitable device as discussed in FIGS. 7-14. Dampers 1820 and 1825 may be formed using elastic tape, rubber foam or other suitable materials as discussed in FIG. 4. Weight 1850 may be suspended from the bottom surface of overlay 1810 by coil spring 1830 and damper 1820 to form a tuned mass damper that is suspended above the frame 1840.

Similar to FIG. 17, system 1800 may be subject to a force 1815 applied to the top surface of overlay 1810 and vibration 1885. The tuned mass damper (e.g., coil spring 1830, damper 1820 and weight 1850) and damper 1825 may minimize resonance and medium frequency oscillations experienced by the force sensor 1855 that are the result of vibrations 1885. In some embodiments, the vibrations 1885 may be caused by an engine from an automobile or another known vibration source and may have a known frequency. Using the known frequency, properties of the coil spring 1830, dampers 1820 and 1825 and weight 1850 may be determined to minimize resonance and medium frequency oscillations caused by vibrations 1885. For example, a spring constant and dimensions of the coil spring 1830, a loss modulus and dimensions of dampers 1820 and 1825 and the mass and dimensions of weight 1850 may be determined based on the known frequency of the vibrations 1885.

Force sensor 1855 may generate an output signal and a transfer function 1865 may be performed on the output signal as previously described in FIG. 17. The output signal may then be passed through a filter 1870 to remove high frequency oscillations from the output signal. For example, the filter 1870 may be a low-pass filter that passes signals below a determined frequency. The filtered output signal of the force sensor 1855 may then be received by a force sensing circuit to be used to determine a force value indicative of the force 1815 applied to the surface of the overlay 1810.

In some embodiments, one or more accelerometers 1860 may be coupled to a surface of frame 1840 that is not subject to force 1815 applied to the top surface of overlay 1810. The accelerometer 1860 may be a multi-axis accelerometer used to measure acceleration of the frame 1840. Alternatively, reference sensors, such as reference sensor 130 of FIG. 1, may function as accelerometers 1860. The accelerometer 1860 may generate an output signal that corresponds to vibrations 1885. The output signal of the accelerometer may be passed through a filter 1875 to remove high frequency oscillations from the output signal of the accelerometer 1860. In one embodiment, the filters 1870 and 1875 may match transfer functions of vibration noise in the signal received from force sensor 1155 and the signal received from the accelerometer 1860. After removing the high frequency oscillations, the filtered output signal of the accelerometer 1860 may correspond to the low frequency oscillations caused by vibration 1885. In one embodiment, accelerometer 1860 and filter 1875 may be separate components. In another embodiment, accelerometer 1860 and filter 1875 may be a single integrated component. The filtered output signal of the accelerometer 1860 may then be received by a force sensing circuit to be used to determine a force value indicative of the force 1815 applied to the surface of the overlay 1810.

After receiving the filtered output signal from the force sensor 1855 and the filtered output signal from the accelerometer 1860, the force sensing circuit may perform a summation 1880 of the filtered output signals. The summation 1880 may subtract the filtered output signal of the accelerometer 1860 from the filtered output signal from the force sensor 1855 to remove the low frequency oscillations caused by the vibrations 1885. The force sensing circuit may then measure a force value indicative of the force 1815 that is applied to the surface of overlay 1810.

Figure 19:
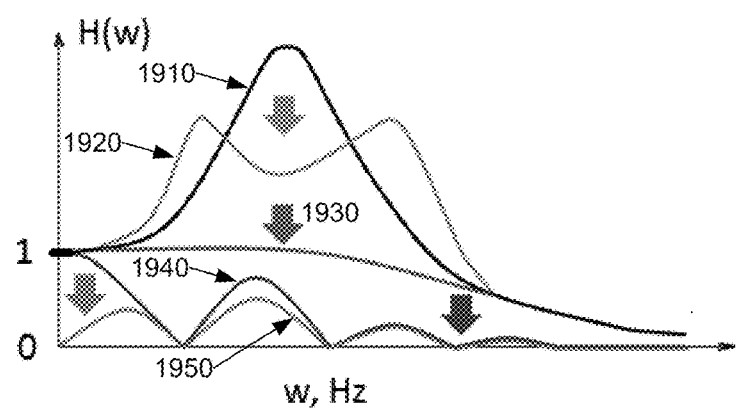
FIG. 19 is a graph illustrating the transfer function of vibration noise in a signal from a force sensor using the components described in FIGS. 17 and 18, according to embodiments.

FIG. 19 is a graph 1900 illustrating the transfer function of vibration noise in a signal from a force sensor using the components described in FIGS. 17 and 18, according to embodiments. Graph 1900 includes a Y-axis that may represent the spectral density of the vibration noise measured by the force sense circuit. The X-axis may represent the frequency (Hz) of the oscillations. Graph 1900 may include curves 1910, 1920, 1930, 1940 and 1950, where the curves correspond to systems having different configurations of components as described in FIGS. 17 and 18. Curve 1910 may correspond to the touch panel device 1700 of FIG. 17 that utilizes a coil spring 1730. Curve 1920 may correspond to a touch panel device having the tuned mass damper (e.g., coil spring 1830, damper 1820 and weight 1850) of FIG. 18. Curve 1930 may correspond to a touch panel device having the tuned mass damper and damper 1825. Curve 1940 may correspond to a touch panel having the tuned mass damper, damper 1825 and filter 1870 of FIG. 18. Curve 1950 may correspond to a touch panel having the tuned mass damper, damper 1825, filter 1870, accelerometer 1860 and filter 1875.

The area below curves 1910, 1920, 1930, 1940 and 1950 may correlate to the force estimation error, where a larger area below the curve may indicate a larger force estimation error. For example, the area below curve 1910 is larger than the area below curve 1950 and therefore the force estimation error of curve 1910 is greater than the force estimation error of curve 1950.

Figures 20A, 20B:
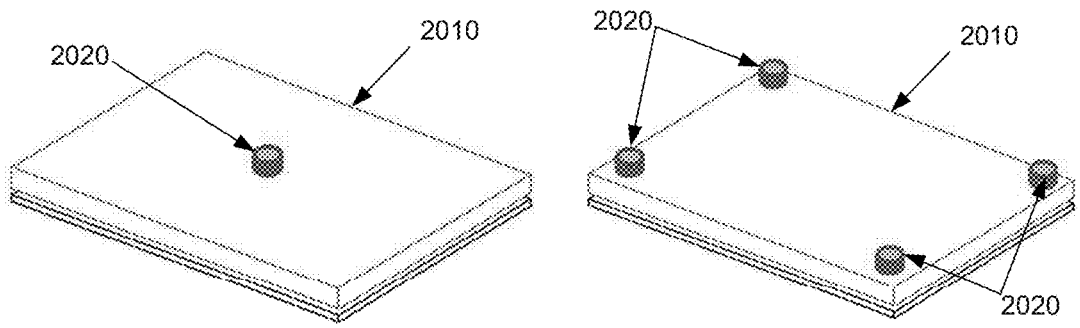
FIG. 20A illustrates positions of accelerometers on the frame of a touch panel device according to embodiments.
FIG. 20B illustrates positions of accelerometers on the frame of a touch panel device according to other embodiments.

FIGS. 20A and 20B illustrate positions of accelerometers on the frame of a touch panel device 2000 according to embodiments. The touch panel device 2000 may include a frame 2010 that corresponds to frame 340 of FIG. 3. The touch panel device 2000 may also include accelerometers 2020 that correspond to accelerometer 1860 of FIG. 18. In some embodiments, the accelerometer 2020 may be a reference sensor that is sensitive to acceleration of the touch panel device 2000, such as reference sensor 130 of FIG. 1. FIG. 20A illustrates an embodiment that utilizes a single accelerometer 2020 to suppress vibration oscillations, as described in FIG. 1. The accelerometer 2020 may be coupled to frame 2010 in a location where it is not subject for any forces being applied to the overlay (not shown) of the touch panel device 2000. FIG. 20B illustrates another embodiment that utilizes multiple accelerometers 1860 to suppress vibration oscillations, as described in FIG. 2. The accelerometers 2020 may be coupled to frame 2010 in a location where it is not subject for any forces being applied to the overlay (not shown) of the touch panel device 2000.

Figure 21:
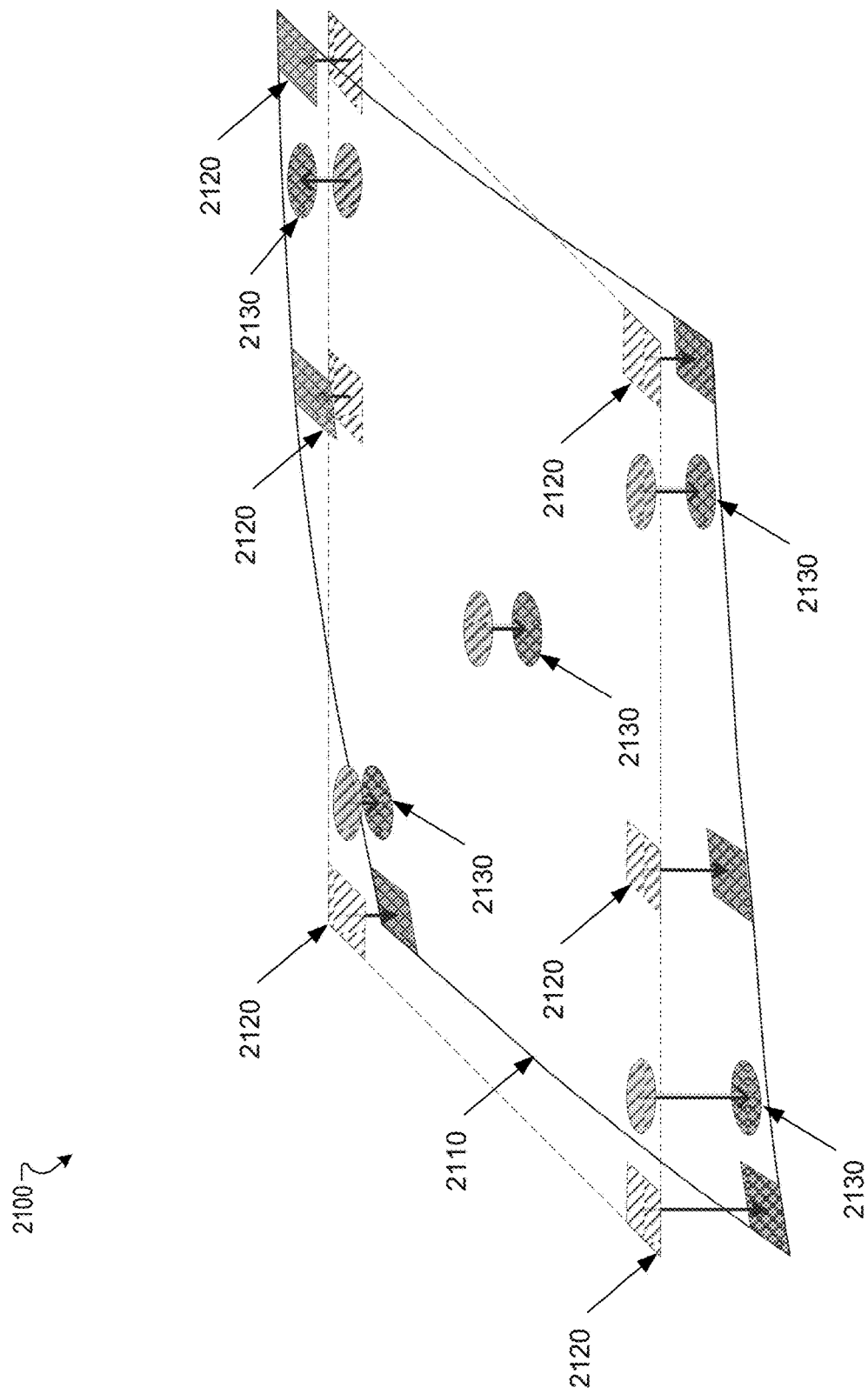
FIG. 21 is an illustration of a touch panel device having arbitrary elastic component and force sensor positions, according to embodiments.

FIG. 21 is an illustration of a touch panel device 2100 having arbitrary elastic component and force sensor positions, according to embodiments. The touch panel device 2100 may include an overlay 2110 that corresponds to overlay 310 of FIG. 3. The touch panel device 2100 may also include force sensors 2120 that correspond to force sensors 120 of FIG. 1. The touch panel device 2100 may further include elastic components 2130 that correspond to elastic components 430 of FIG. 4. As can be seen by inspection of FIG. 21, force sensors 2120 and elastic components 2130 may be positioned at various locations on the bottom surface of overlay 2110. When a force is applied to the overlay 2110, some force sensors 2120 and elastic components 2130 may be compressed, while other force sensors 2120 and elastic components 2130 may be expanded, as illustrated by the arrows of FIG. 21.

Figure 22:
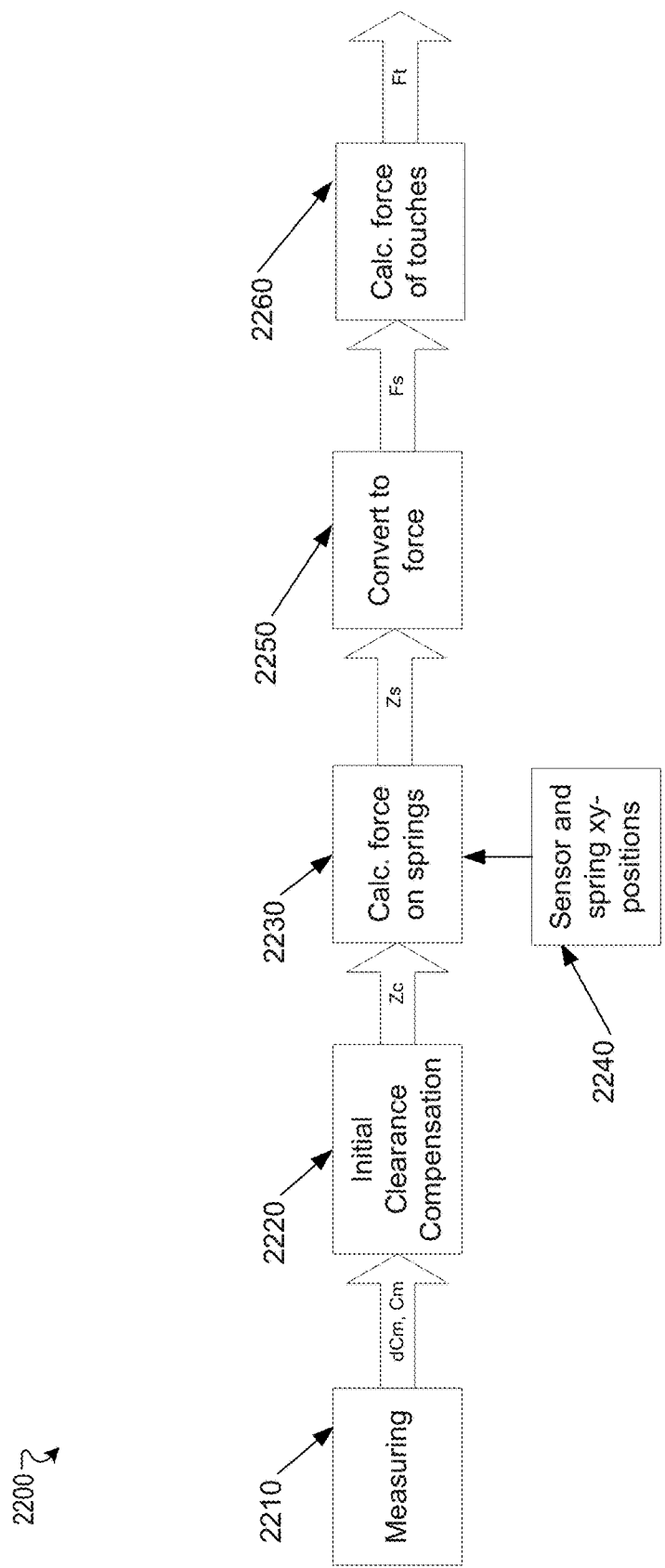
FIG. 22 depicts a flow diagram of an example method to calculate the force of multiple touches using arbitrarily place force sensors and elastic components, according to some embodiments.

FIG. 22 depicts a flow diagram of an example method 2200 to calculate the force of multiple touches using arbitrarily placed force sensors and elastic components, according to embodiments. The method 2200 may be performed by a processing device that may include hardware (e.g., processing logic, circuitry, dedicated logic, programmable logic, microcode, etc.), software (e.g., instructions run or executed on a processing device), or a combination thereof. In general, the method 2200 may be performed by a force sensing circuit coupled to touch panel device 2100 of FIG. 21.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 2200 begins my measuring one or more forces being applied to an overlay of a touch panel device, as previously described (block 2210). Following the measurement, an initial clearance compensation may be determined to be used as a baseline capacitance value (block 2220). The initial clearance compensation may be determined using a specific algorithm for each sensor to convert capacitance data into geometric parameters of the sensor, such as clearance (e.g., the distance between the frame and overlay). The determination of the initial clearance compensation will be discussed in more detail below at FIGS. 23 and 24. After the initial clearance compensation has been determined, the force on the springs may be calculated (block 2220) using the positions of the sensors and springs (block 2240). To estimate the deflection of the springs, the tilt of the overlay may be approximated. The tilt of the overlay coupled to the force sensing circuit may be approximated by a plane and determined using the following equation:

$$\begin{pmatrix} \sum x_{c,i}^2 & \sum x_{c,i} y_{c,i} & \sum x_{c,i} \\ \sum x_{c,i} y_{c,i} & \sum y_{c,i}^2 & \sum y_{c,i} \\ \sum x_{c,i} & \sum y_{c,i} & 1 \end{pmatrix} \begin{pmatrix} A \\ B \\ C \end{pmatrix} = \begin{pmatrix} \sum z_{c,i} x_{c,i} \\ \sum z_{c,i} y_{c,i} \\ \sum z_{c,i} \end{pmatrix}$$

Where $x_c$ and $y_c$ correspond to the x and y positions of the force sensor relative to the overlay and $z_c$ corresponds to the magnitude of the force applied to the force sensor. Then, the deflection of the springs may be estimated using the following equation:

$$z_{S,j} = A x_{S,j} + B y_{S,j} + C$$

Where $x_s$ and $y_s$ correspond to the x and y positions of the spring relative to the overlay and $z_s$ corresponds to the force applied to the spring. Using the spring constant and the estimated deflection of the springs, the deflection may be converted into force (block 2250). After the deflection of springs has been converted into force, the forces of each touch of the multiple touches may be calculated, as will be discussed in more detail at FIG. 25.

Figure 23:
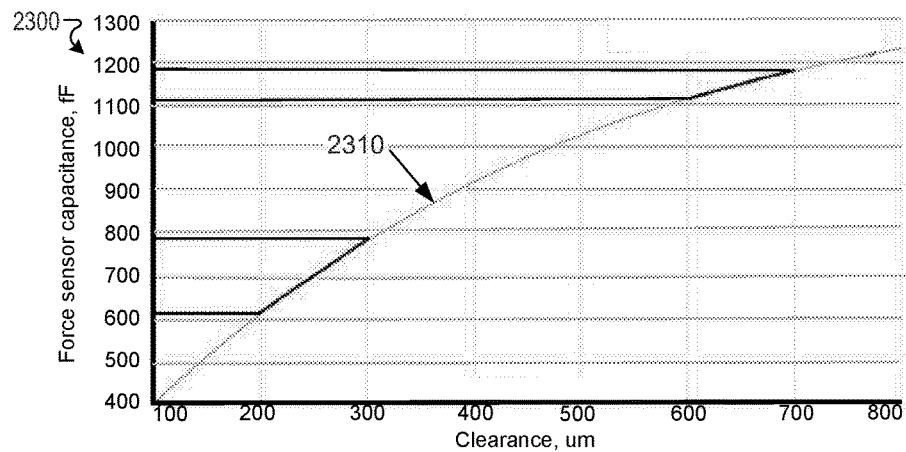
FIG. 23 is a graph illustrating the capacitance of a force sensor in relation to the clearance between the overlay and the frame of a touch panel device, according to embodiments.

FIG. 23 is a graph 2300 illustrating the capacitance of a force sensor in relation to the clearance between the overlay and the frame of a touch panel device, according to embodiments. Graph 2300 may be representative of the capacitance of a parallel plate force sensor, such as force sensor 1500 of FIG. 15. Graph 2300 may include a Y-axis that is representative of the capacitance of a force sensor and an X-axis that is representative of the clearance between the two electrodes of the force sensor. Curve 2310 may represent the capacitance of the force sensor relative to the clearance between the two electrodes of the force sensor. The capacitance response to a change in clearance may be determined using the following equation:

$$d = \alpha \left[ \ln\left(1 + \frac{D_F}{\beta + R_{xo}}\right) \right],$$

Where d is the clearance, $\alpha$ and $\beta$ are coefficients that correlate to the relationship between capacitance and clearance between electrodes of a capacitor, $R_{xo}$ is a baseline capacitance and $D_F$ is the output signal of an ADC (e.g., ADC 160) that is proportional to the capacitance of a force sensing capacitor (e.g., Cforce 122). Using the above equation, the clearance of the force sensor may be determined based on a change of capacitance.

Figure 24:
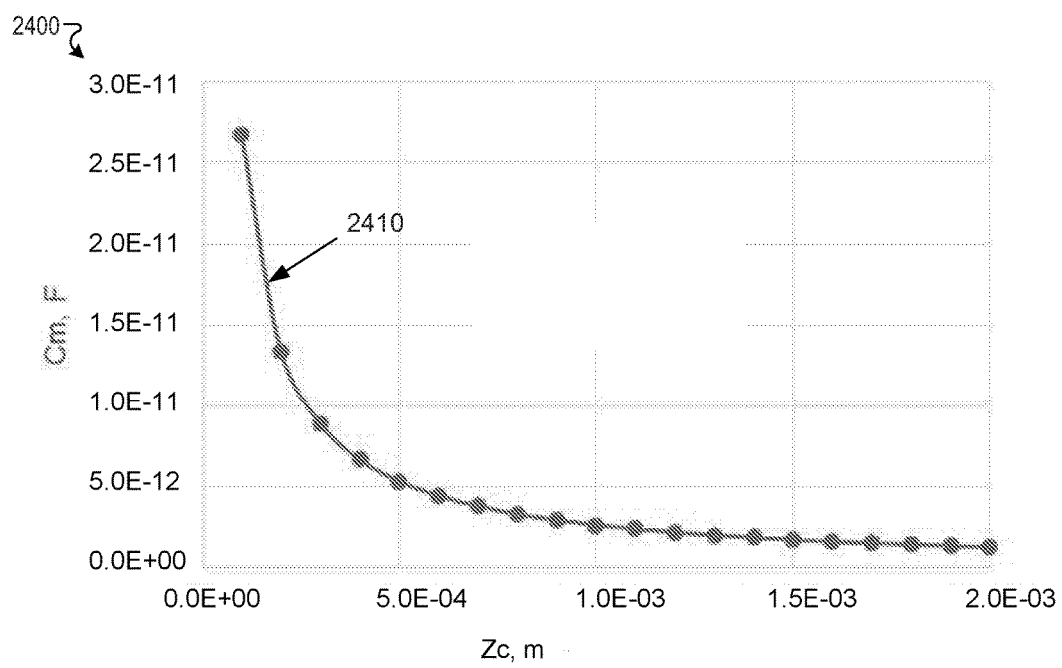
FIG. 24 is a graph illustrating the capacitance of a force sensor in relation to the clearance between the overlay and the frame of a touch panel device, according an embodiment.

FIG. 24 is a graph 2400 illustrating the capacitance of a force sensor in relation to the clearance between the overlay and the frame of a touch panel device, according to embodiments. Graph 2400 may be representative of the capacitance of planar force sensor, such as force sensor 1550 of FIG. 15. Graph 2400 may include a Y-axis that is representative of the capacitance of a force sensor and an X-axis that is representative of the clearance between the two electrodes of the force sensor. Curve 2410 may represent the capacitance of the force sensor relative to the clearance between the electrodes of the force sensor and a grounded object, such as the frame of the touch panel device. The capacitance response to a change in clearance may be determined using the following equation:

$$d = \frac{\alpha}{D_F}$$

Where d is the clearance, $\alpha$ and $\beta$ are coefficients that correlate to the relationship between capacitance and clearance between electrodes of a capacitor, and $D_F$ is the output signal of an ADC (e.g., ADC 160) that is proportional to the capacitance of a force sensing capacitor (e.g., Cforce 122). Using the above equation, the clearance of the force sensor may be determined based on a change of capacitance.

Figure 25:
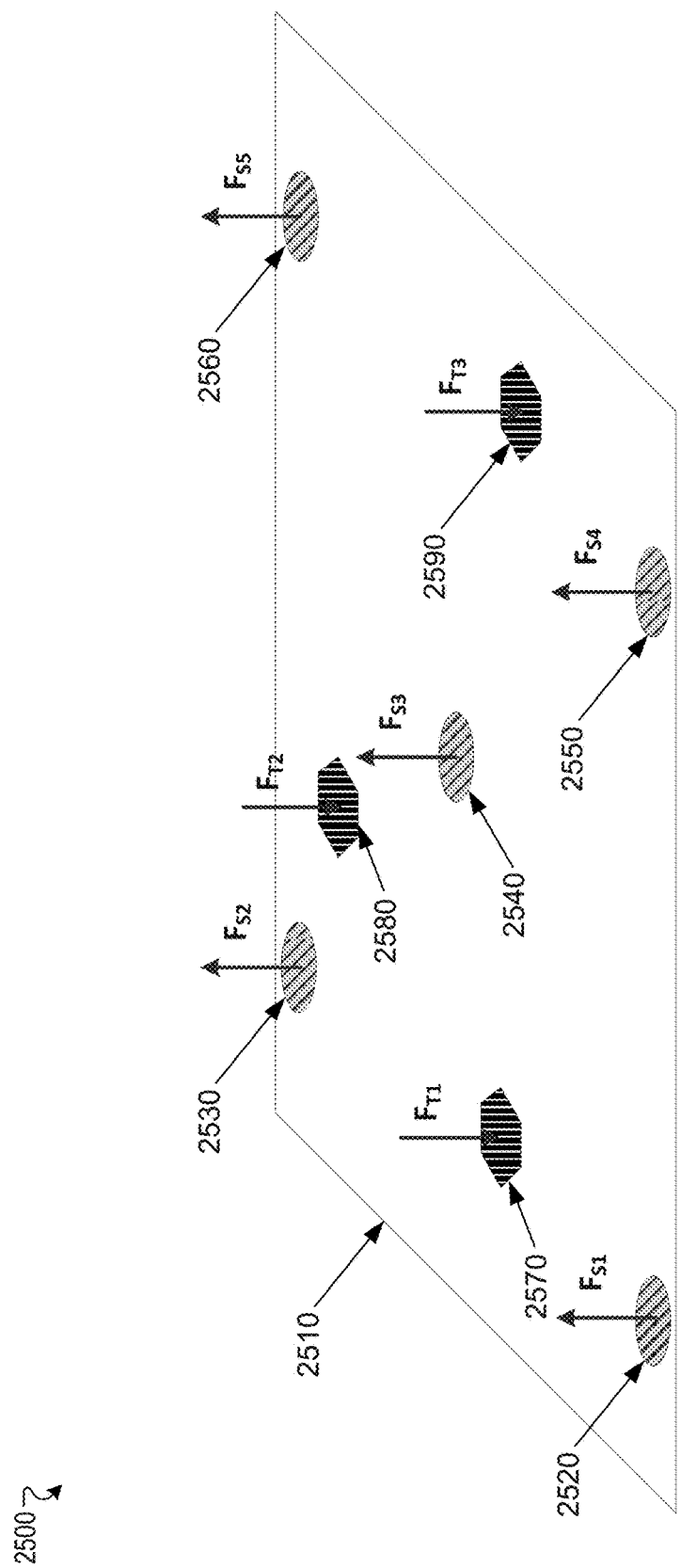
FIG. 25 is an illustration of determining the force of each touch of multiple touches applied to an overlay of a touch panel device, according to embodiments.

FIG. 25 is an illustration 2500 of determining the force of each touch of multiple touches applied to an overlay 2510 of a touch panel device, according to embodiments. The overlay 2510 may correspond to overlay 310 of FIG. 3. A first spring 2520, a second spring 2530, a third spring 2540, a fourth spring 2550 and a fifth spring 2560 may be located beneath overlay 2510. A first force 2570, a second force 2580 and a third force 2590 may apply a downward force to the overlay 2510 at three different locations. For example, forces 2570, 2580 and 2590 may be three fingers of a user pressing down on the overlay 2510. In response to the downward force being applied by forces 2570, 2580 and 2590, springs 2520, 2530, 2540, 2550 and 2560 may apply an upward force on overlay 2510. The force of the springs 2520, 2530, 2540, 2550 and 2560 may correspond to the force determined at block 2250 of FIG. 22. The overlay 2510 may include a touch sensor panel (not shown) to determine X, Y coordinates of forces 2570, 2580 and 2590, as will be discussed in more detail at FIG. 28 below.

To determine the individual force values of the first force 2570, the second force 2580 and the third force 2590, the forces 2570, 2580 and 2590 may be divided into two groups to form a system of two equations. The first group may include all three forces 2570, 2580 and 2590 to form the first equation below:

$$\begin{pmatrix} 1 & 1 & 1 \\ x_1 & x_2 & x_3 \\ y_1 & y_2 & y_3 \end{pmatrix} \begin{pmatrix} F_{T,1} \\ F_{T,2} \\ F_{T,3} \end{pmatrix} = \begin{pmatrix} \sum F_{S,i} \\ \sum F_{S,i} x_{S,i} \\ \sum F_{S,i} y_{S,i} \end{pmatrix}$$

Where $x_{1,2,3}$ and $y_{1,2,3}$ correspond to positions of forces 2570, 2580 and 2590, respectively, relative to the overlay 2510, $F_{T1,T2,T3}$ corresponds to estimates of the force values of forces 2570, 2580 and 2590, respectively, $F_S$ corresponds to the force of the springs and $X_S$ and $Y_S$ correspond to positions of springs 2520, 2530, 2540, 2550 and 2560 relative to overlay 2510. The second group may include the first force 2570 and the second force 2580 to form the second equation below:

$$\begin{pmatrix} 1 & 1 \\ x_1 & x_2 \\ y_1 & y_2 \end{pmatrix} \begin{pmatrix} F_{T,1} \\ F_{T,2} \end{pmatrix} = \begin{pmatrix} \sum F_{S,i} \\ \sum F_{S,i} x_{S,i} \\ \sum F_{S,i} y_{S,i} \end{pmatrix}$$

Where $x_{1,2}$ and $y_{1,2}$ correspond to positions of forces 2570 and 2580, respectively, relative to the overlay 2510, $F_{T1,T2}$ corresponds to estimates of the force values of forces 2570 and 2580, respectively, $F_S$ corresponds to the force of the springs and $X_S$ and $Y_S$ correspond to positions of springs 2520, 2530, 2540, 2550 and 2560 relative to overlay 2510. The estimates of the force values of forces (e.g., $F_{T1,T2,T3}$) 2570, 2580 and 2590 may be determined using the above two equations. The results may then be combined using a window function to determine the force value of each of forces 2570, 2580 and 2590.

Figure 26:
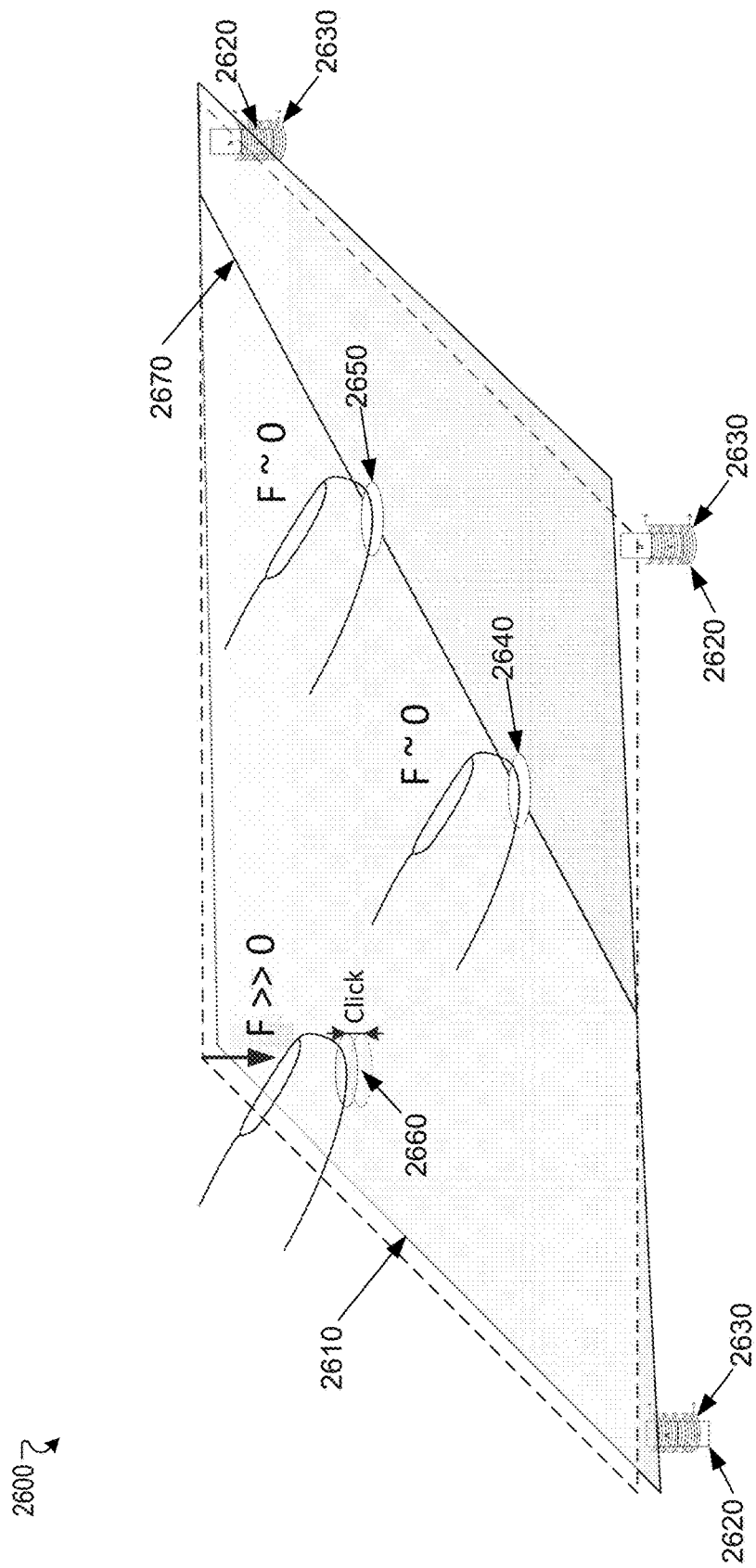
FIG. 26 illustrates a system for providing individual finger haptic feedback, according to embodiments.

FIG. 26 illustrates a system 2600 for providing individual finger haptic feedback, according to embodiments. The system 2600 may include an overlay 2610 that corresponds to overlay 310 of FIG. 3. The system 2600 may also include magnetic springs 2620 and solenoids 2630 that correspond to magnetic springs 1430 and solenoids 1460 of FIG. 14, respectively. In some embodiments, one or more magnetic springs 2620 including solenoids 2630 may be coupled to the bottom surface of the overlay 2610. For example, four magnetic springs 2620 including solenoids 2630 may be coupled to the bottom surface of the overlay 2610 and positioned in each corner of the overlay 2610. In other embodiments, the magnetic springs 2620 including solenoids 2630 may be coupled to LCD 330 of FIG. 3 or a frame (not shown) around the LCD 330 and overlay 2610. Solenoids 2630 may be selectively energized to provide haptic feedback to a touch that is applying a force to the overlay 2610. In the present embodiment, touches 2640, 2650 and 2660 may correspond to fingers of a user being in contact with the overlay 2610. Touches 2640 and 2650 may not be applying a force to the overlay 2610. Touch 2660 may be applying a force to the overlay 2610, which may result in a clicking sensation. In one embodiment, touch 2660 may be at a location that corresponds to a button displayed by LCD 330 of FIG. 3 which may result in a clicking sensation. In some embodiments, touches 2640, 2650 and 2660 may all apply a force to the overlay 2610. To selectively provide haptic feedback to touch 2660, a pivot axis 2670 may be determined by the system that connects touches 2640 and 2650. The pivot axis 2670 may be a portion of the overlay 2610 that does not experience haptic feedback. Then, planar parameters may be determined using the following equation:

$$\begin{pmatrix} x_1 & y_1 & 1 \\ x_2 & y_2 & 1 \\ x_3 & y_3 & 1 \end{pmatrix} \begin{pmatrix} A \\ B \\ C \end{pmatrix} = \begin{pmatrix} z_1 \\ z_2 \\ z_3 \end{pmatrix}$$

where $x_{1,2,3}, y_{1,2,3}$ and $z_{1,2,3}$ correspond to positions of touches 2640, 2650 and 2660, respectively, relative to overlay 2610. Then, using the determined planar parameters, the current to be provided to each solenoid 2630 may be determined using the following equation:

$$z_{I,j} = Ax_{I,j} + By_{I,j} + C$$

where $x_{I,j}$, $y_{I,j}$ and $z_{I,j}$ may correspond to positions of solenoids 2630 relative to overlay 2610. The determined current may then be provided to solenoids 2630, resulting in haptic feedback being provided to touch 2660 via overlay 2610, without haptic feedback being provided to touches 2640 and 2650 located on pivot axis 2670.

Figure 27:
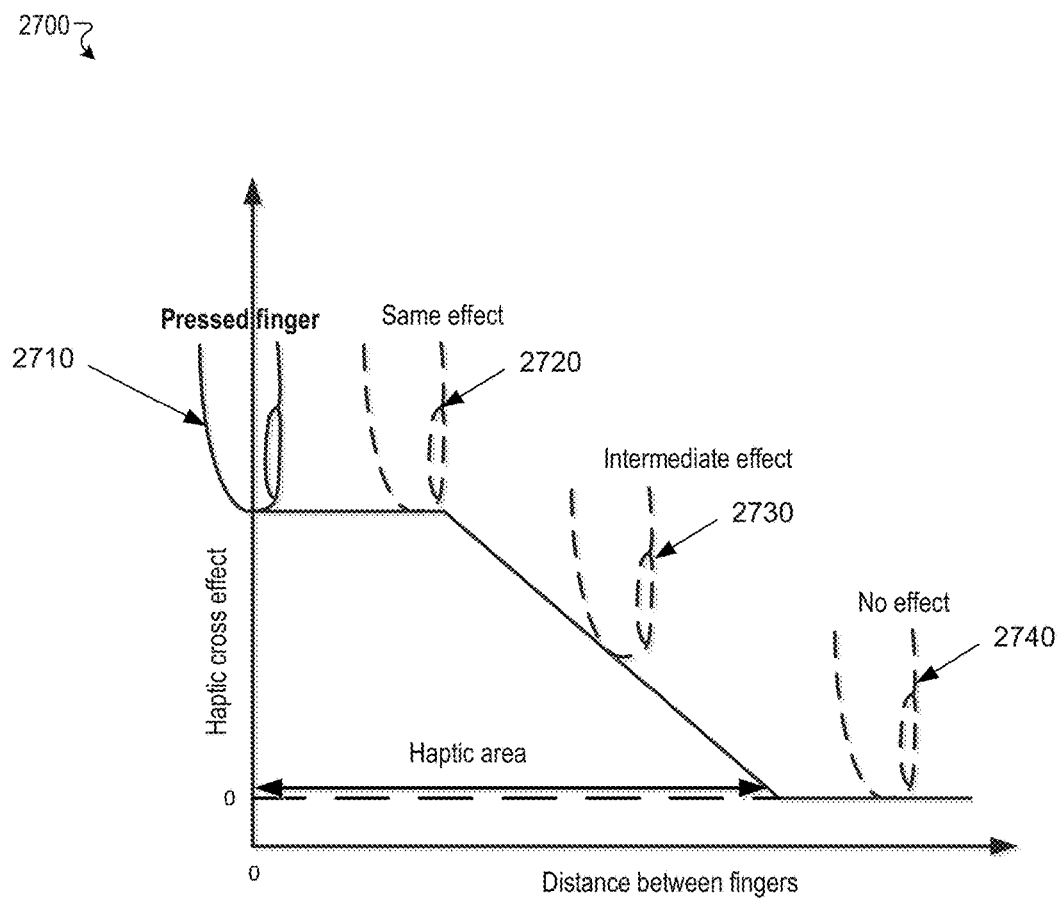
FIG. 27 is a graph illustrating of the correlation of distance between touches and the haptic feedback received by the touches, according to an embodiment.

FIG. 27 is a graph 2700 illustrating of the correlation of distance between touches and the haptic feedback received by the touches, according to an embodiment. The graph 2700 may include a Y-axis that represents the haptic cross effect provided to a touch and an X-axis that represents the distance between touches. Pressed finger 2710 may be a touch that is applying a force to an overlay, such as touch 2660 of FIG. 26. Touches 2720, 2730 and 2740 may correspond to touches 2640 and/or 2650 of FIG. 26. As can be seen in graph 2700, when touch 2720 is located in close proximity to touch 2710, touch 2720 will experience the same haptic feedback effect as touch 2710. As the distance between touch 2710 and touch 2730 increases, the haptic feedback effect may decrease. When a threshold distance from 2710 has been reached, touch 2740 may not experience the haptic feedback effect felt by touch 2710.

Figure 28:
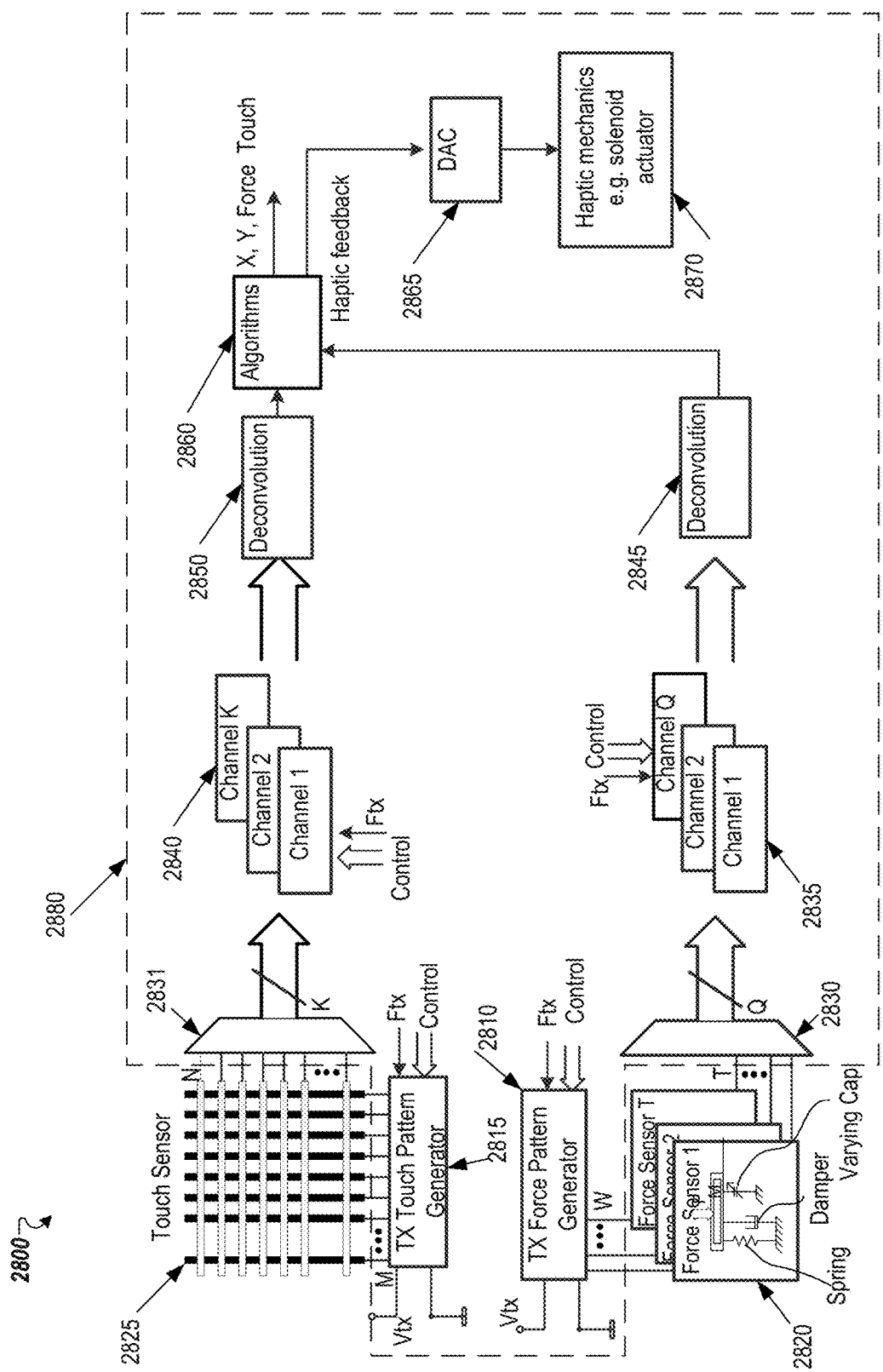
FIG. 28 is an electronic device comprising a touch sensor panel, a force sensor panel, and a processing device according to one embodiment.

FIG. 28 is an electronic device 2800 comprising a touch sensor panel 2825, a force sensor panel 2820, and a processing device 2880 according to one embodiment. The processing device 2880 includes multiple terminals, including terminals that are coupled to electrodes of the touch sensor panel 2825 and terminals that are coupled to electrodes of the force sensor panel 2820. The force sensor panel 2820 includes one or more force sensors 2820. The force sensors 2820 may be similar to the force sensors 120, 220, described above with respect to FIGS. 1-2. As illustrated in FIG. 28, the force sensors 2820 may include electrodes that operate as a varying capacitor as described herein. The force sensors 2820 may also include a spring, a damper, or any combination thereof. Alternatively, the force sensors 2820 may be other types of force sensors, as described herein. The processing device 2880 includes a signal generator 2810 that is similar to the signal generator 110 described above with respect to FIG. 1. The signal generator 2810 outputs a repeating signal (TX) on a first terminal and an inverted copy of the repeating signal (–TX) on a second terminal. Although FIG. 28 illustrates a single signal generator 2810, in other embodiments, the processing device 2880 may include multiple signal generators. For example, one signal generator generates the TX signal and another signal generator generates the –TX signal. The processing device 2880 also includes an optional multiplexer 2830 that is similar to the multiplexer 140 of FIG. 1 and one or more receiver channels 2835. As described with respect to FIG. 2, the multiplexer 2830 may not be used in some embodiments, such as when there are K number of force sensors 2820 and K number of receiver channels 2835. The receiver channels 2835 are similar to the receiver channels 150 of FIG. 1 or the receiver channels 250 of FIG. 2. Although not illustrated in FIG. 28, an ADC is coupled to the receiver channels 2835 to digitize the analog signals measured by the receiver channels 2835. A deconvolution block 2845 may be used to perform additional signal processing of digital values of force data before inputting the force data into one or more algorithms 2860 implemented by the processing device 2880. The algorithm(s) 2860 may be processing logic comprising hardware, software, firmware, or any combination thereof, to process the force data for one or more applications. Touch data may also be input into the algorithm(s) 2860. The algorithm(s) 2860 can determine a touch event, including a touch coordinate (X,Y) of a touch of an object proximate to the touch sensor panel 2825 as described below, as well as how much force the touch is applied against an assembly, including the touch sensor panel 2825 and the force sensor panel 2820. The force of the touch can be reported as a Z-coordinate along with the X,Y coordinate of the touch. The output of the algorithm(s) 2860 can be used for various applications, such as for gesture recognition, cursor control, or other user input applications, such as automotive applications. Also, an output of the algorithm(s) 2860 can converted from digital values to analog values using a digital-to-analog converter (DAC) 286 to be used in connection with haptic mechanics 2870, such as a solenoid actuator.

To obtain the touch data that is input into the algorithm(s) 2860, the processing device 2880 may include a capacitance measurement circuit, including a signal generator 2815, a multiplexer 2831, multiple receiver channels 2840, and a deconvolution block 2850. The signal generator 2815 generates one or more signals that are applied to one or more terminals of the touch sensor panel 2825. For example, the signal generator 2815 can apply a TX signal to one or more of TX terminals, whereas the receiver channels 2840 measure corresponding RX signals on one or more of the RX terminals, via the multiplexer 2831. The RX signals may represent a mutual capacitance between an intersection of at least one of the TX terminals and at least one of the RX terminals. In some embodiments, the capacitance measurement circuit may include multiple signal generators 2815, where each of the multiple signal generators 2815 can apply a TX signal to one or more TX terminals. The receiver channels 2840 can use any one of various capacitance measurement techniques, such as charge transfer, charge accumulation, sigma-delta modulation, or the like. The processing device 2880 may include other types of capacitance measurements circuits to measure mutual capacitance, self capacitance, or both. Also, in other embodiments, the processing device 2880 may include other types of touch sensing circuits to measure or sense touches on the touch sensor panel 2825, such as inductive, resistive, capacitive sensing, or the like. The outputs of the receiver channels 2840 can be digitized by an ADC (not illustrated in FIG. 28) and output to the deconvolution block 2850 for further signal processing. The output of the deconvolution block 2850 is input into the algorithm(s) 2860. In some embodiments, the processing device 2880 can utilize the touch data from the touch sensor panel 2825 for one application and the force data from the force sensor panel 2820 for another application. In other embodiments, the processing device 2880 can combine the touch data and the force data for one or more applications. Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and or alternating manner. The terms "first," "second," "third," "fourth," etc. as used herein are meant as labels to distinguish among different elements and may not necessarily have an ordinal meaning according to their numerical designation. As used herein, the term "coupled" may mean connected directly or indirectly through one or more intervening components. Any of the signals provided over various buses described herein may be time multiplexed with other signals and provided over one or more common on-die buses. Additionally, the interconnection and interfaces between circuit components or blocks may be shown as buses or as single signal lines. Each of the buses may alternatively be one or more single signal lines and each of the single signal lines may alternatively be buses.

The above description sets forth numerous specific details such as examples of specific systems, components, methods, and so forth, in order to provide an understanding of several embodiments of the present invention. It may be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

What is claimed is:

1. An apparatus comprising:
   a first signal generator of a force sensing circuit to output a first excitation (TX) signal on a first terminal and a second TX signal on a second terminal, wherein the first terminal and the second terminal are configured to couple to a first force sensor and a reference sensor, wherein the first force sensor is subject to deformation by a touch object, and wherein the reference sensor is not subject to deformation by the touch object; and
   a first receiver channel of the force sensing circuit coupled to a third terminal and a fourth terminal, wherein the third terminal is configured to couple to the first force sensor and the fourth terminal is configured to couple to the reference sensor, wherein the force sensing circuit is configured to measure a first receive (RX) signal from the first force sensor via the third terminal and a second RX signal from the reference sensor via the fourth terminal, wherein the force sensing circuit is configured to measure a force value indicative of a force applied by the touch object to the first force sensor by using the second RX signal to remove noise from the first RX signal caused by vibration of the apparatus.

2. The apparatus of claim 1, wherein the force sensing circuit comprises:
   a multiplexer coupled to the third terminal and the fourth terminal;
   a second signal generator to output a third TX signal on a fifth terminal and a fourth TX signal on a sixth terminal, wherein the fifth terminal and the sixth terminal are configured to couple to a second force sensor and the reference sensor; and
   a second receiver channel coupled to the multiplexer, wherein the multiplexer is coupled to a seventh terminal, wherein the second force sensing circuit is configured to measure a third RX signal from the second force sensor via the seventh terminal and the second RX signal from the reference sensor via the fourth terminal, wherein the second force sensing circuit is configured to measure a second force value indicative of the force applied to the second force sensor using the second RX signal and the third RX signal.

3. The apparatus of claim 1, wherein the force sensing circuit comprises:
   a second signal generator to output a third TX signal on a fifth terminal and fourth TX signal on a sixth terminal, wherein the fifth terminal and the sixth terminal are configured to couple to a second force sensor and a second reference sensor; and
   a second receiver channel coupled to a seventh terminal and an eighth terminal, wherein the second force sensing circuit is configured to measure a third RX signal from the second force sensor via the seventh terminal and a fourth RX signal from the second reference sensor via the eighth terminal, wherein the second force sensing circuit is configured to measure a second force value indicative of the force applied to the second force sensor using the third RX signal and the fourth RX signal.

4. The apparatus of claim 1, wherein the force sensing circuit comprises:
   the first signal generator to output a third TX signal on a fifth terminal and fourth TX signal on a sixth terminal, wherein the fifth terminal and the sixth terminal are configured to couple to a second force sensor and a second reference sensor; and
   a second receiver channel coupled to a seventh terminal and an eighth terminal, wherein the second force sensing circuit is configured to measure a third RX signal from the second force sensor via the seventh terminal and a fourth RX signal from the second reference sensor via the eighth terminal, wherein the second force sensing circuit is configured to measure a second force value indicative of the force applied to the second force sensor using the third RX signal and the fourth RX signal.

5. The apparatus of claim 1, further comprising:
   a third signal generator to output a third TX signal on a ninth terminal, wherein the ninth terminal is configured to couple to a first sense unit; and
   a capacitance measurement circuit coupled to a tenth terminal, wherein the capacitance measurement circuit is configured to measure a capacitance of the first sense unit via the ninth terminal, wherein the capacitance measurement circuit is configured to determine a location of the touch object using the capacitance of the first sense unit.

6. The apparatus of claim 5, wherein the first sense unit comprises a first electrode and a second electrode, wherein the capacitance is a mutual capacitance between the first electrode and the second electrode.

7. The apparatus of claim 5, further comprising a processing component coupled to a first output from the force sensing circuit and a second output from the capacitance measurement circuit, wherein the processing component is configured to correlate the force value indicative of the force to the location of the touch object.

8. The apparatus of claim 1, wherein the first signal generator comprises:
an alternating current (AC) power source coupled to the first terminal, the AC power source to generate the first TX signal; and
an inverter coupled to the AC power source and coupled to second terminal, the inverter to generate an inverted copy of the first TX signal as the second TX signal.

9. The apparatus of claim 1, wherein the force sensing circuit comprises an analog-to-digital converter (ADC) coupled to the first receiver channel.

10. The apparatus of claim 2, wherein the force sensing circuit comprises an analog-to-digital converter (ADC) coupled to an output of the first receiver channel and an output of the second receiver channel.

11. A method comprising:
generating a first excitation (TX) signal and a second TX signal;
measuring, by a force sensing circuit, a first capacitance of a first force sensor that is subject to deformation by a touch object;
measuring, by the force sensing circuit, a second capacitance of a reference sensor that is not subject to deformation by the touch object; and
determining a force applied by the touch object to the first force sensor by using the second capacitance to remove noise from the first capacitance caused by vibration.

12. The method of claim 11, wherein the second capacitance of the reference sensor is substantially similar to the first capacitance of the first force sensor at a steady state.

13. The method of claim 11, wherein a change in the first capacitance of the first force sensor corresponds to a change in distance between two electrodes of the first force sensor, the change in distance being indicative of the force applied to the first force sensor.

14. The method of claim 11, wherein change in the second capacitance of the reference sensor corresponds to vibrations in the reference sensor, and wherein the reference sensor is not subject to the force applied to the first force sensor.

15. A system comprising:
a force touch panel comprising a first force sensor and a reference sensor; and
a processing device operatively coupled to the force touch panel, the processing device comprising:
a first signal generator of a force sensing circuit to output a first excitation (TX) signal and a second TX signal, wherein the first TX signal is configured to couple to the first force sensor and the reference sensor, wherein the first force sensor is subject to a force applied to the force touch panel by a touch object and the reference sensor is not subject to the force applied to the force touch panel by the touch object; and
a first receiver channel of the force sensing circuit coupled to the first force sensor and the reference sensor, wherein the force sensing circuit is configured to measure a first receive (RX) signal from the first force sensor and a second RX signal from the reference sensor, wherein the force sensing circuit is configured to measure a force value indicative of the force applied by the touch object to the first force sensor by using the second RX signal to remove noise from the first RX signal caused by vibration of the system.

16. The system of claim 15, wherein the force sensing circuit comprises:
a multiplexer coupled to the first force sensor, the reference sensor and the force sensing circuit;
a second signal generator to output a third TX signal and a fourth TX signal, wherein the third TX signal is configured to couple to a second force sensor and the fourth TX signal is configured to couple to the reference sensor; and
a second force sensing circuit coupled to the multiplexer, wherein the second force sensing circuit is configured to measure a third RX signal from the second force sensor and the second RX signal from the reference sensor, wherein the second force sensing circuit is configured to measure a second force value indicative of the force applied to the second force sensor using the second RX signal and the third RX signal.

17. The system of claim 15, the processing device further comprising:
a second signal generator to output a third TX signal and a fourth TX signal, wherein the third TX signal is configured to couple to a second force sensor and the fourth TX signal is configured to couple to a second reference sensor; and
a second force sensing circuit coupled to the second force sensor and the second reference sensor, wherein the second force sensing circuit is configured to measure a third RX signal from the second force sensor and a fourth RX signal from the second reference sensor, wherein the second force sensing circuit is configured to measure a second force value indicative of the force applied to the second force sensor using the third RX signal and the fourth RX signal.

18. The system of claim 15, wherein the force touch panel has a plurality of electrodes to determine a location of the touch object on the force touch panel based on a change of capacitance received from the plurality of electrodes.

19. The system of claim 15, wherein the first force sensor comprises:
a first electrode disposed in a first plane; and
a second electrode disposed in a second plane, wherein the first electrode and the second electrode vary in capacitance between the first electrode and the second electrode in response to a change in distance between the first electrode and the second electrode caused by force applied to the first force sensor.

20. The system of claim 15, wherein the first force sensor comprises:
a first electrode disposed in a plane; and
a second electrode disposed in the plane, wherein the first electrode and the second electrode vary in capacitance between the first electrode and the second electrode in response to a change in distance between the first electrode and the second electrode caused by force applied to the first force sensor.

21. The system of claim 15, further comprising:
an alternating current (AC) power source coupled to the first force sensor and the reference sensor, the AC power source to generate the first TX signal; and an inverter coupled to the AC power source, the first force sensor and the reference sensor, the inverter to generate an inverted copy of the first TX signal as the second TX signal.

* * * * *